(12) United States Patent
Hasegawa et al.

(10) Patent No.: US 11,934,725 B2
(45) Date of Patent: Mar. 19, 2024

(54) INFORMATION PROCESSING DEVICE, DISPLAY METHOD, AND PROGRAM

(71) Applicant: SEIKO EPSON CORPORATION, Tokyo (JP)

(72) Inventors: Jin Hasegawa, Shiojiri (JP); Koki Nomura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/821,524

(22) Filed: Aug. 23, 2022

(65) Prior Publication Data
US 2023/0055145 A1 Feb. 23, 2023

(30) Foreign Application Priority Data
Aug. 23, 2021 (JP) .................................. 2021-135468

(51) Int. Cl.
*G06F 3/12* (2006.01)
*G03G 15/00* (2006.01)

(52) U.S. Cl.
CPC ......... *G06F 3/1256* (2013.01); *G03G 15/502* (2013.01); *G06F 3/1205* (2013.01)

(58) Field of Classification Search
CPC .... G06F 3/1256; G06F 3/1205; G06F 3/1258; G06F 3/1243; G03G 15/502
See application file for complete search history.

(56) References Cited

U.S. PATENT DOCUMENTS

| | | | | |
|---|---|---|---|---|
| RE49,242 E | * | 10/2022 | Asai | ........................ H04W 4/80 |
| 2008/0204809 A1 | * | 8/2008 | Miyashita | ............. G06F 40/174 358/1.18 |
| 2012/0050778 A1 | * | 3/2012 | Shiohara | ............... G06F 3/1256 358/1.13 |

FOREIGN PATENT DOCUMENTS

JP 2002062864 A 2/2002

* cited by examiner

*Primary Examiner* — Iriana Cruz

(74) *Attorney, Agent, or Firm* — CHIP LAW GROUP

(57) ABSTRACT

A control device includes a memory configured to store variable data including a plurality of page images each including a variable region where an image is variable for each page and a non-variable region including the same image irrespective of the page and a display processing section configured to cause a display device to display a printing preview screen for the variable data. The display processing section causes the display device to display the printing preview screen that displays one or a plurality of row images in which the plurality of page images are arranged in a row in a first direction corresponding to the width direction of a printing medium.

9 Claims, 14 Drawing Sheets

FIG. 3
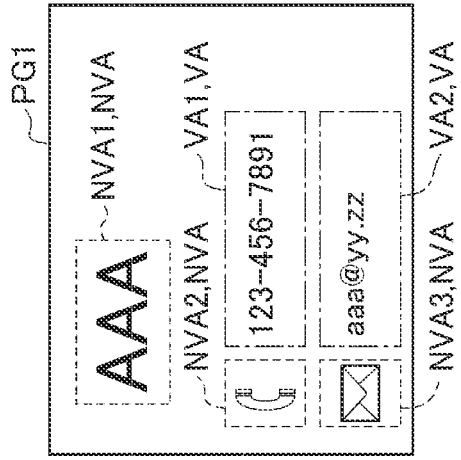
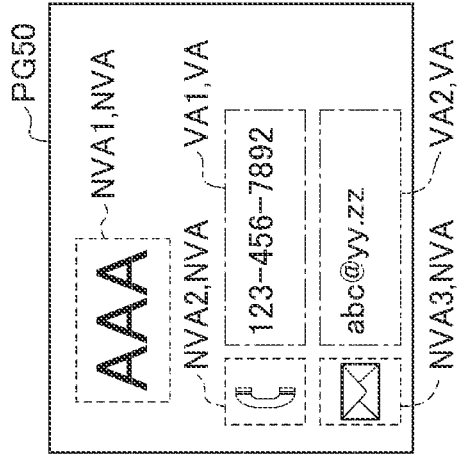
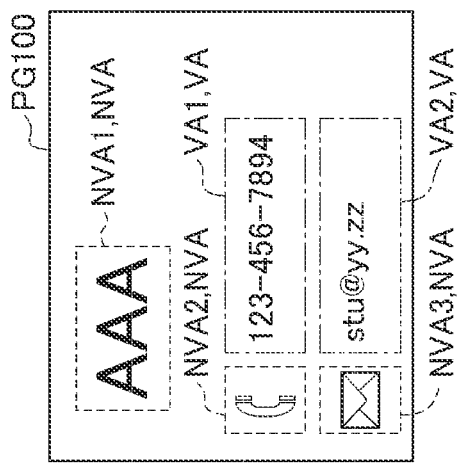

FIG. 4

FIG. 8
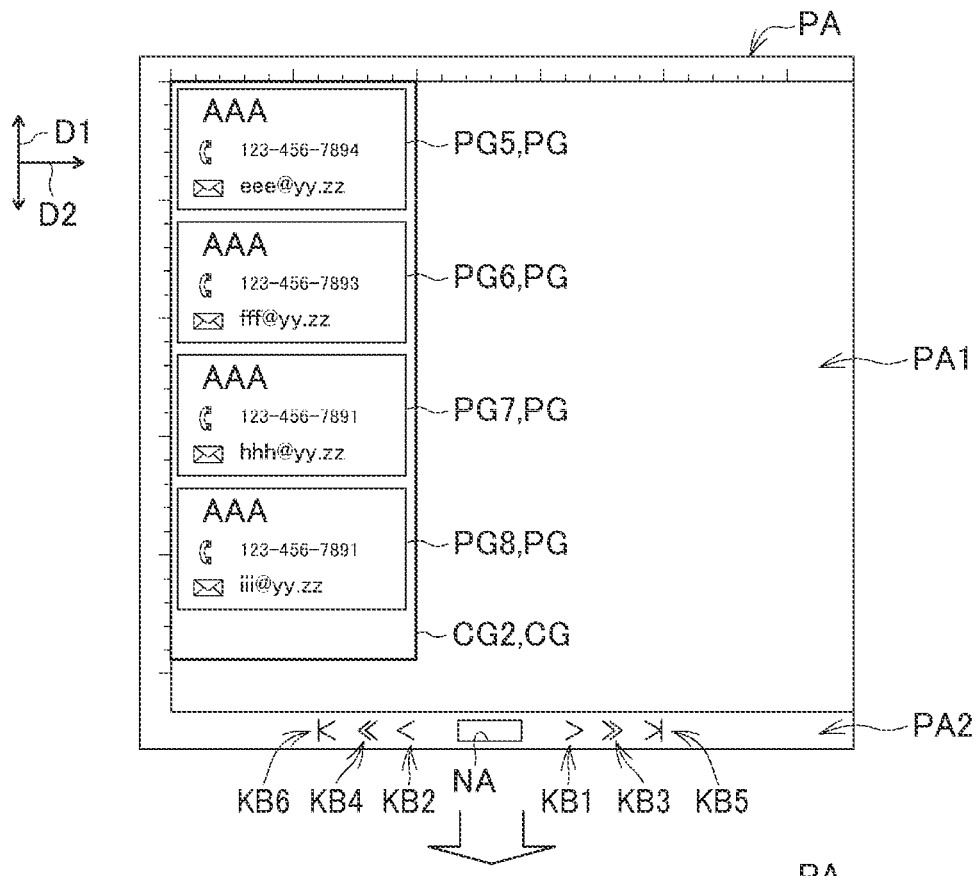
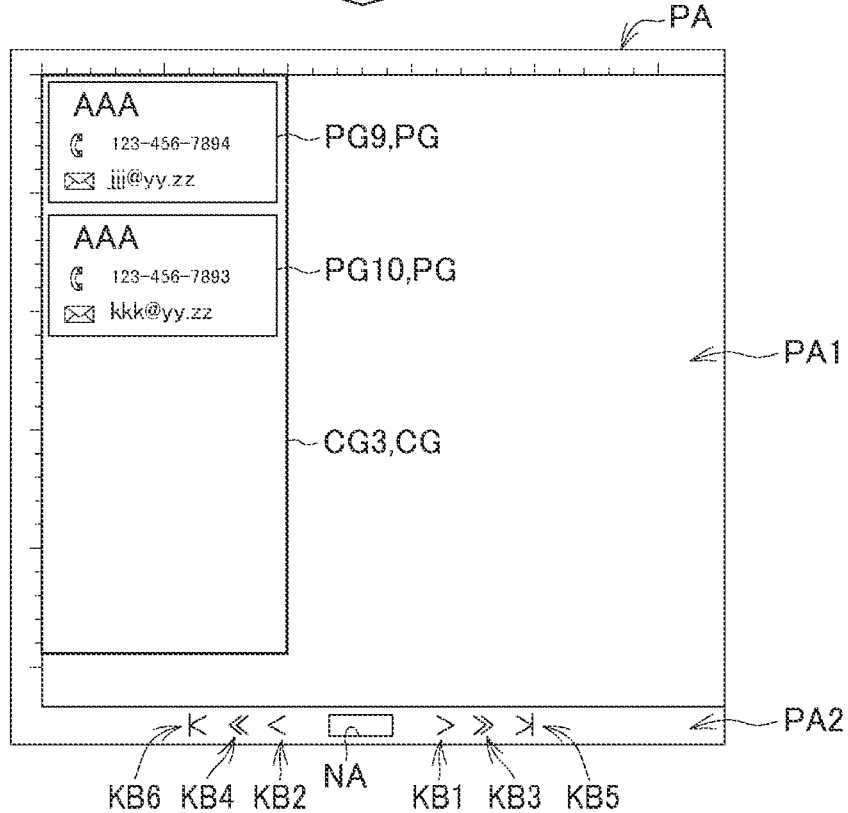

INFORMATION PROCESSING DEVICE, DISPLAY METHOD, AND PROGRAM

The present application is based on, and claims priority from JP Application Serial Number 2021-135468, filed Aug. 23, 2021, the disclosure of which is hereby incorporated by reference herein in its entirety.

BACKGROUND

1. Technical Field

The present disclosure relates to an information processing device, a display method, and a program.

2. Related Art

There has been known a technique for displaying a printing preview in variable printing. For example, JP-A-2002-062864 (Patent Literature 1) discloses a preview window capable of switching an image in page units.

In Patent Literature 1, an image corresponding to a page is switched in page units on the preview window. Therefore, when a user previews a desired page, it could occur that the user performs image switching operation many times. Accordingly, Patent Literature 1 has a problem in that it is likely that the user cannot easily grasp printing content of the variable printing.

SUMMARY

An aspect of the present disclosure is directed to an information processing device including: a storing section configured to store variable data including a plurality of page images each including a first region where an image is variable for each page and a second region including a same image irrespective of the page; and a display processing section configured to cause a display section to display a printing preview screen for the variable data. The display processing section causes the display section to display the printing preview screen that displays one or a plurality of row images in which the plurality of page images are arranged in a row in a first direction corresponding to a width direction of a printing medium.

Another aspect of the present disclosure is directed to a display method including causing a display section to display a printing preview screen of variable data including a plurality of page images each including a first region where an image is variable for each page and a second region including a same image irrespective of the page. The printing preview screen displays one or a plurality of row images in which the plurality of page images are arranged in a row in a first direction corresponding to a width direction of a printing medium.

Still another aspect of the present disclosure is directed to a non-transitory computer-readable storage medium storing a program, the program causing a processor to function as a display processing section configured to cause a display section to display a printing preview screen of variable data including a plurality of page images each including a first region where an image is variable for each page and a second region including a same image irrespective of the page. The display processing section causes the display section to display the printing preview screen that displays one or a plurality of row images in which the plurality of page images are arranged in a row in a first direction corresponding to a width direction of a printing medium.

BRIEF DESCRIPTION OF THE DRAWINGS

FIG. 3 is a diagram showing an example of variable data.

FIG. 4 is a diagram showing an example of a printing preview screen.

FIG. 8 is a diagram for explaining a first row unit switching button and a second row unit switching button.

DESCRIPTION OF EXEMPLARY EMBODIMENTS

Embodiments are explained below with reference to the drawings.

First Embodiment

First, a first embodiment is explained.

Figure 1:
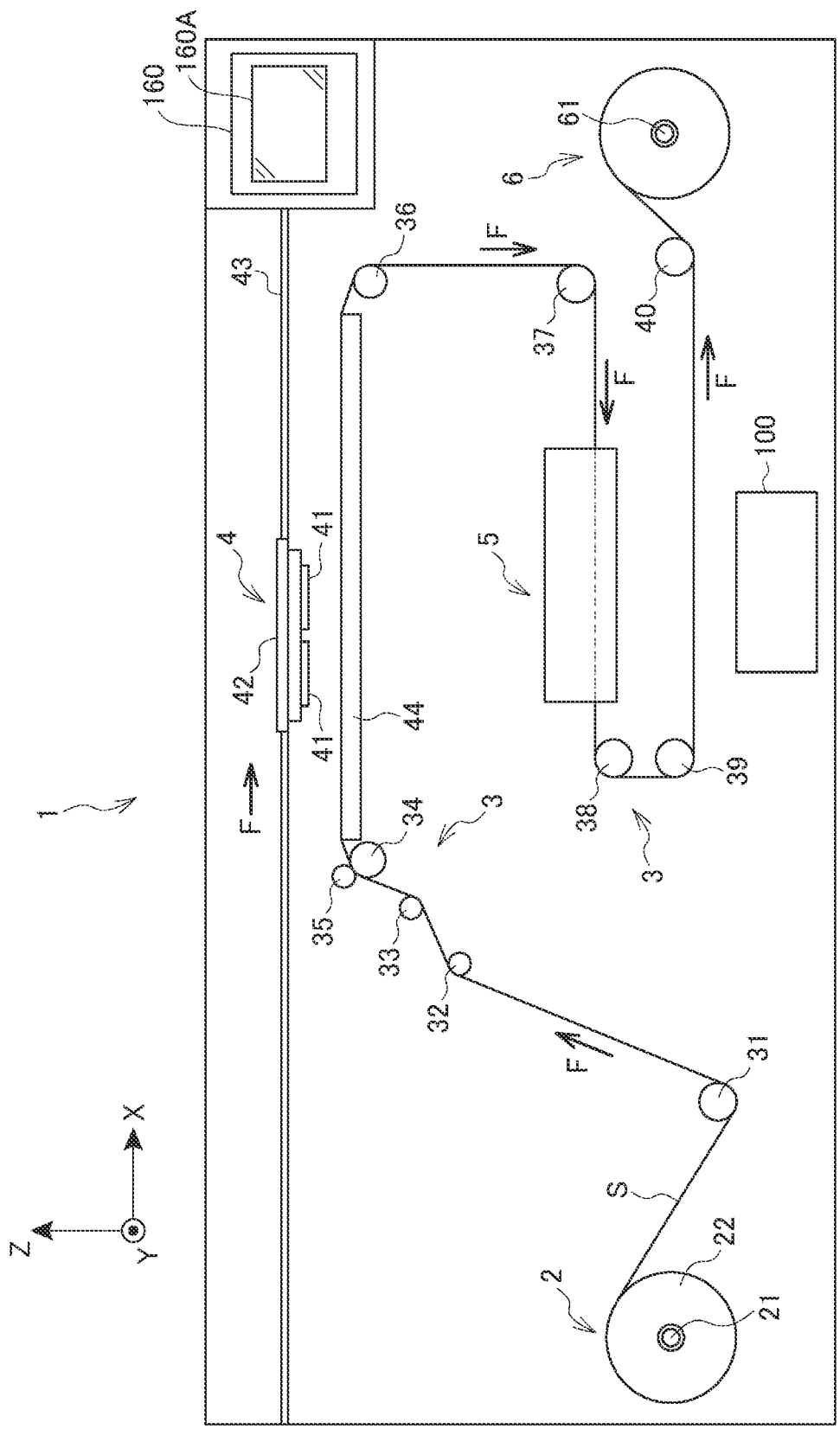
FIG. 1 is a diagram showing the configuration of a printing apparatus.

FIG. 1 is a diagram showing the configuration of a printing apparatus 1.

In FIG. 1, an X axis, a Y axis, and a Z axis are illustrated. The X axis, the Y axis, and the Z axis are orthogonal to one another. The Z axis indicates the up-down direction and the vertical direction in a set state of the printing apparatus 1. The X axis and the Y axis are parallel to the horizontal direction. The X axis indicates the front-rear direction of the printing apparatus 1. The Y axis indicates the left-right direction of the printing apparatus 1. The left-right direction of the printing apparatus 1 is the width direction of a printing medium S. A positive direction of the Z axis indicates the upward direction. A positive direction of the X axis indicates the rear direction. A positive direction of the Y axis indicates the right direction.

The printing apparatus 1 is an inkjet printer that ejects ink to the printing medium S to thereby form an image. Various sheets can be used as the printing medium S used in the printing apparatus 1. Examples of the printing medium S include paper such as plain paper and high quality paper and a film made of synthetic resin. In the following explanation, label paper is illustrated as the printing medium S. The label paper is roll-like paper obtained by arranging labels on release paper.

The printing apparatus 1 includes a medium supplying section 2, a medium conveying section 3, a printing section 4, a drying section 5 a medium collecting section 6, a control device 100, and a display device 160.

The control device 100 is an example of an "information processing device". The display device 160 is an example of a "display section".

The medium supplying section 2 supplies the printing medium S to the printing section 4. The medium supplying section 2 includes a cylindrical or columnar supply shaft 21. The supply shaft 21 rotates with the power of a delivery motor 184. A roll body 22 obtained by winding the printing medium S in a roll shape is attached to the supply shaft 21. The printing medium S is delivered from the roll body 22 by the rotation of the supply shaft 21.

The medium conveying section 3 conveys, in a conveying direction indicated by a sign F, the printing medium S supplied by the medium supplying section 2. The medium conveying section 3 includes a plurality of conveying rollers 31, 32, 33, 34, 35, 36, 37, 38, 39, and 40 that come into contact with the printing medium S and configures a conveying path for the printing medium S.

The conveying rollers 31, 32, and 33 convey, toward the printing section 4, the printing medium S delivered from the medium supplying section 2. A pair of conveying rollers 34 and 35 nips the printing medium S and conveys the printing medium S toward the printing section 4.

The printing section 4 ejects ink to the printing medium S to thereby print an image on a label of the printing medium S. The printing section 4 includes a plurality of ejection heads 41 that eject the ink and a carriage 42 that holds the ejection heads 41.

The carriage 42 is capable of reciprocating in an X-axis direction along a first guiderail 43 set in the printing apparatus 1 along the X-axis direction. The carriage 42 is capable of reciprocating in a Y-axis direction along a not-shown second guiderail set along the Y-axis direction. The carriage 42 is driven by a first carriage motor 181 and a second carriage motor 182 and moves the ejection heads 41 in the X-axis direction and the Y-axis direction. That is, the printing apparatus 1 in this embodiment is a lateral-type inkjet head printer.

The printing section 4 causes the ejection heads 41 to eject the ink while moving the ejection heads 41 in the Y-axis direction to thereby execute printing in the width direction of the printing medium S. In a state in which the printing medium S is stopped, the printing section 4 moves the ejection heads 41 in the X-axis direction to move the ejection heads 41 in the X-axis direction with respect to the printing medium S. The printing section 4 moves the ejection heads 41 in the Y-axis direction and executes printing in the width direction of the printing medium S. In this way, while the medium conveying section 3 stops the conveyance of the printing medium S, the printing section 4 executes printing in a region expanding in the X-axis direction and the Y-axis direction on the printing medium S.

The medium conveying section 3 intermittently conveys the printing medium S with the power of a conveying motor 183. That is, the medium conveying section 3 conveys the printing medium S in a conveying direction F by a predetermined length and stops the printing medium S. The predetermined length is length in the X-axis direction in which the printing section 4 is capable of executing printing while the conveyance of the printing medium S is stopped. The printing section 4 moves the ejection heads 41 in the Y-axis direction and the X-axis direction and executes printing on the stopped printing medium S. When the printing by the printing section 4 is completed, the medium conveying section 3 conveys the printing medium S along the X-axis direction.

The printing apparatus 1 includes a platen 44 disposed to be opposed to the printing section 4. The platen 44 includes a rectangular surface disposed to be parallel to a XY plane. The platen 44 supports the printing medium S from a side opposed to the printing section 4. A heater that heats the platen 44 is provided below the platen 44. The printing medium S is heated during printing or before and after the printing to accelerate drying of the ink that reaches the printing medium S.

The printing medium S on which an image is printed is conveyed from the printing section 4 to the drying section 5 by the conveying rollers 36 and 37. The drying section 5 includes, for example, a heater that heats a printing surface of the printing medium S and a heater that heats the rear surface of the printing surface. The drying section 5 heats the printing medium S to thereby dry the ink adhering to the printing medium S.

The printing medium S is conveyed from the drying section 5 to the medium collecting section 6 by the conveying rollers 38, 39, and 40. The medium collecting section 6 includes a winding shaft 61 that rotates with the power of a winding motor 185. The medium collecting section 6 winds, on the winding shaft 61, the printing medium S dried by the drying section 5 and collects the printing medium S.

All of the conveying rollers 31, 32, 33, 36, 37, 38, 39 and 40 come into contact with one surface of the printing medium S and convey the printing medium S while guiding the printing medium S. The conveying rollers 34 and 35 nip and convey the printing medium S. However, this is a specific example. The number and the configuration of conveying rollers included in the medium conveying section 3 can be changed as appropriate. For example, the medium conveying section 3 may include a plurality of roller pairs that nip the printing medium S.

Figure 2:
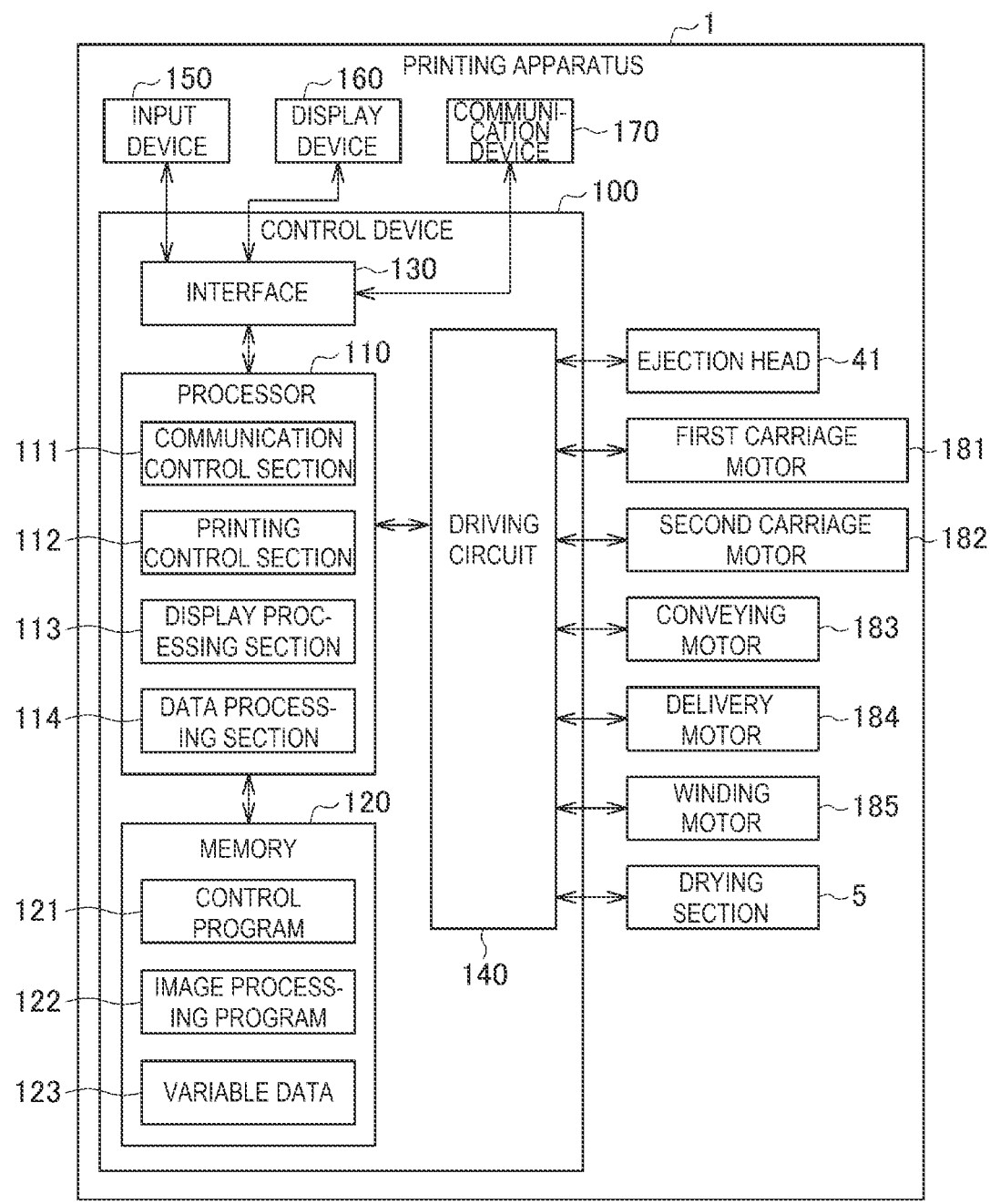
FIG. 2 is a block diagram showing the configuration of a control system of the printing apparatus.

FIG. 2 is a block diagram showing a control system of the printing apparatus 1.

The printing apparatus 1 includes an input device 150, the display device 160, and a communication device 170. The input device 150, the display device 160, and the communication device 170 are coupled to the control device 100. The input device 150 is a device for a user, who operates the printing apparatus 1, to perform various inputs to the printing apparatus 1 and is an input device such as a switch, a keyboard, or a mouse. The input device 150 outputs information input by the user to the control device 100. The display device 160 includes a display 160A and displays various kinds of information on the display 160A according to control by the control device 100. The printing apparatus 1 may include a touch panel obtained by integrating the input device 150 and the display device 160. In FIG. 1, as an example, the display device 160 is provided in a rear upper part of the printing apparatus 1. However, a setting position of the display device 160 is not limited to the rear upper part. The communication device 170 includes communication hardware such as an antenna and a communication circuit and communicates with an external apparatus different from the printing apparatus 1.

The control device 100 is a device that controls the sections of the printing apparatus 1. The control device 100 includes a processor 110 such as a CPU (Central Processing Unit) or an MPU (Micro Processing Unit), a memory 120, an interface 130, and a driving circuit 140.

The memory 120 is an example of a "storing section".

The processor 110 reads out and executes a control program 121 stored in the memory 120 to thereby control the sections of the printing apparatus 1. The processor 110 executes the control program 121 stored in the memory 120 to function as a communication control section 111 and a printing control section 112. The processor 110 executes an image processing program 122 stored in the memory 120 to function as a display processing section 113 and a data processing section 114.

The image processing program 122 is an example of a "program".

The memory 120 stores the control program 121, the image processing program 122, setting data relating to setting of the printing apparatus 1, and other various data. When the printing apparatus 1 receives variable data 123, the memory 120 stores the variable data 123. The memory 120 includes a nonvolatile storage region. The memory 120 may include a volatile storage region and configure a work area of the processor 110.

The image processing program 122 is a program including a function of generating a printing preview screen VG, which is a screen for a printing preview, a function of displaying the printing preview screen VG, a function of generating raster data or printing data, and a function of outputting the generated raster data or printing data. The image processing program 122 in this embodiment is a program different from the control program 121 but may be a program included in the control program 121.

FIG. 3 is a diagram showing an example of the variable data 123.

The variable data 123 is data used for variable printing. The variable data 123 is data configured by a plurality of pages. The variable data 123 includes page images PG corresponding to pages by the number of pages configuring the variable data 123. Examples of a data format of the variable data 123 include a PDF (Portable Document Format).

In the following explanation, when the page images PG are described by distinguishing page numbers, numbers are added following the sign of PG. That is, when the page image PG corresponding to a page, a page number of which is n, is described, in other words, when the page image PG corresponding to an n-th page counted from the top page set as a first page is described, in the following explanation, the page image PG is described as page image PGn; n is an integer equal to or larger than 1.

The page images PG included in the variable data 123 include a viable region VA, which is a region where an image is variable for each page, and a non-variable region NVA having the same image irrespective of the page. Each of the page images PG shown in FIG. 3 includes two variable regions VA, that is, variable regions VA1 and VA2, and three non-variable regions NVA, that is, non-variable regions NVA1, NVA2, and NVA3.

The variable region VA is an example of a "first region". The non-variable region NVA is an example of a "second region".

FIG. 3 shows the variable data 123 configured by one hundred pages. In FIG. 3, among one hundred page images PG, a page image PG1, a page image PG50, and a page image PG100 are representatively shown. As it is evident when the page images PG1, PG50, and PG100 are compared, an image of each of the non-variable regions NVA1, NVA2, and NVA3 is the same in the page images PG1, PG50, and PG100. On the other hand, an image of each of the variable regions VA1 and VA2 is different in the page images PG1, PG50, and PG100.

The interface 130 includes communication hardware such as a connector and an interface circuit. The interface 130 is coupled to the input device 150, the display device 160, and the communication device 170 and performs data communication with the devices.

The driving circuit 140 is coupled to the ejection heads 41, the first carriage motor 181, the second carriage motor 182, the conveying motor 183, the delivery motor 184, the winding motor 185, and the drying section 5.

The driving circuit 140 outputs a control signal according to the control by the control device 100 to thereby cause the ejection heads 41, the first carriage motor 181, the second carriage motor 182, the conveying motor 183, the delivery motor 184, and the winding motor 185 to operate. The driving circuit 140 causes the drying section 5 to operate. The conveying motor 183 drives the medium conveying section 3 and drives to rotate at least any one of the conveying rollers 31, 32, 33, 34, 35, 36, 37, 38, 39, and 40.

The control device 100 drives the ejection heads 41 and ejects the ink toward the printing medium S. The control device 100 drives the first carriage motor 181 and moves the carriage 42 in the X-axis direction. The control device 100 drives the second carriage motor 182 and moves the carriage 42 in the Y-axis direction. The control device 100 alternately repeatedly executes main scanning by the first carriage motor 181, the second carriage motor 182, and the ejection heads 41 and sub-scanning by the conveying motor 183 and intermittently conveys the printing medium S and intermittently prints the printing medium S.

The control device 100 drives the conveying motor 183 and moves the printing medium S in the conveying direction. The control device 100 drives the delivery motor 184 and rotates the supply shaft 21 to deliver the printing medium S. The control device 100 drives the winding motor 185 and rotates the winding shaft 61 to wind the printing medium S. The control device 100 actuates the heater of the drying section 5 to dry the ink adhering to the printing medium S.

As explained above, the processor 110 functions as the communication control section 111, the printing control section 112, the display processing section 113, and the data processing section 114.

The communication control section 111 communicates with the external apparatus different from the printing apparatus 1 via the communication device 170.

The printing control section 112 performs intermittent printing. That is, the printing control section 112 controls the ejection heads 41, the first carriage motor 181, the second carriage motor 182, the conveying motor 183, the delivery motor 184, the winding motor 185, and the drying section 5 and intermittently prints the printing medium S while intermittently conveying the printing medium S.

The display processing section 113 causes the display device 160 to display the printing preview screen VG. The printing preview screen VG is explained below. When receiving operation of the user on the printing preview screen VG via the input device 150, the display processing section 113 switches display content of the printing preview screen VG to display content corresponding to the received operation.

The data processing section 114 generates, based on the variable data 123, data to be output to the printing control section 112. The data processing section 114 generates raster data such as TIFF (Tagged Image File Format) data as the data to be output to the printing control section 112. The data processing section 114 generates, for each of row images CG, raster data of the row image CG explained below. The data processing section 114 outputs the generated raster data to the printing control section 112. The printing control section 112 generates printing data for printing the row image CG indicated by the raster data input from the data processing section 114 and prints the row image CG on the printing medium S based on the generated printing data. The printing data includes a control command conforming to a command system of the printing apparatus 1.

The data processing section 114 may be configured to generate printing data based on the generated raster data and output the generated printing data to the printing control section 112.

The printing preview screen VG is explained with reference to FIGS. 4, 5, 6, 7, 8, 9, and 10. In FIGS. 4, 7, 8, 9, and 10, the up-down direction in the figures is referred to as first direction and indicated by a sign D1 and a direction to the right in the figures is referred to as second direction and indicated by a sign D2. The first direction D1 is a direction corresponding to the width direction of the printing medium S and is the latitudinal direction of the printing preview screen VG. The second direction D2 is a direction orthogonal to the first direction D1 and is a direction corresponding to the conveying direction F of the printing medium S and is a direction to the right in a front view of the printing preview screen VG.

Figure 4:
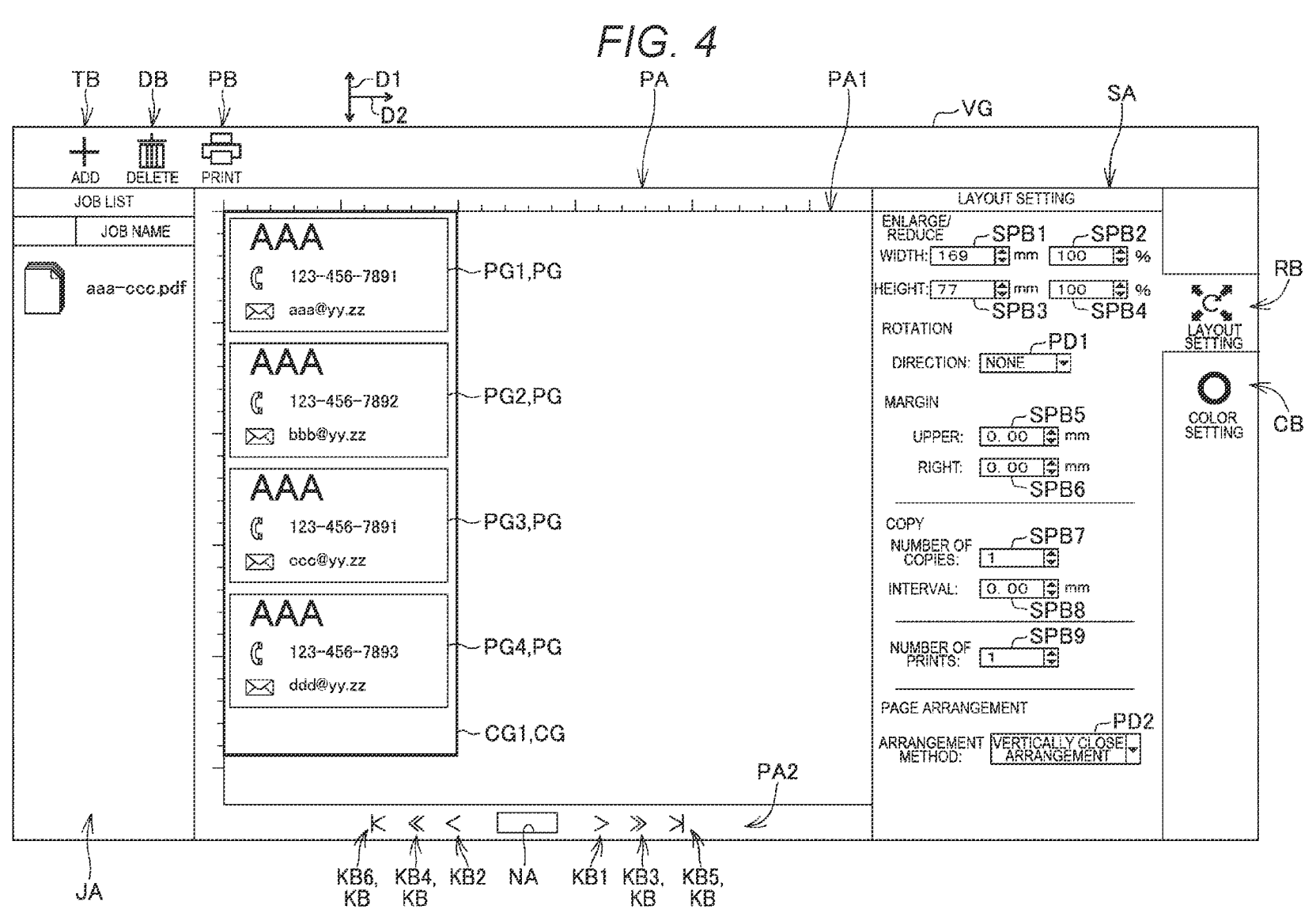

FIG. 4 is a diagram showing an example of the printing preview screen VG.

The printing preview screen VG includes a job list region JA, a printing preview region PA, and a setting region SA.

The job list region JA is a region where data names of data added to the printing preview screen VG as printing jobs are displayed as a list. The variable data 123 and data other than the variable data 123 can be added to the printing preview screen VG. The data other than the variable data 123 is, for example, data configured by only one page. The job list region JA shown in FIG. 4 illustrates a case in which the variable data 123 having a data name "aaa-bbb.pdf" is added to the printing preview screen VG.

The printing preview region PA includes an image display region PA1 and an operation region PA2.

The image display region PA1 is a region where printing content is displayed. When printing content of variable printing is displayed, the row image CG can be displayed in the image display region PA1. The row image CG is an image in which a plurality of page images PG are arranged in a row in the first direction D1.

In the following explanation, when the row image CG is distinguished, a number is added following the sign of CG. This number is hereinafter referred to as "row number". When the row number indicates an m-th row image CG, in the following explanation, the m-th row image CG is described as a row image CGm; m is an integer equal to or larger than 1. In this embodiment, as the row number is smaller, the row image CG corresponding to the row number includes the page image PG having a smaller page number. Accordingly, a row image CG1 includes the page image PG1. The printing preview screen VG shown in FIG. 4 illustrates a case in which the row image CG1 is displayed in the image display region PA1.

The row image CG is explained in detail.

Figure 5:
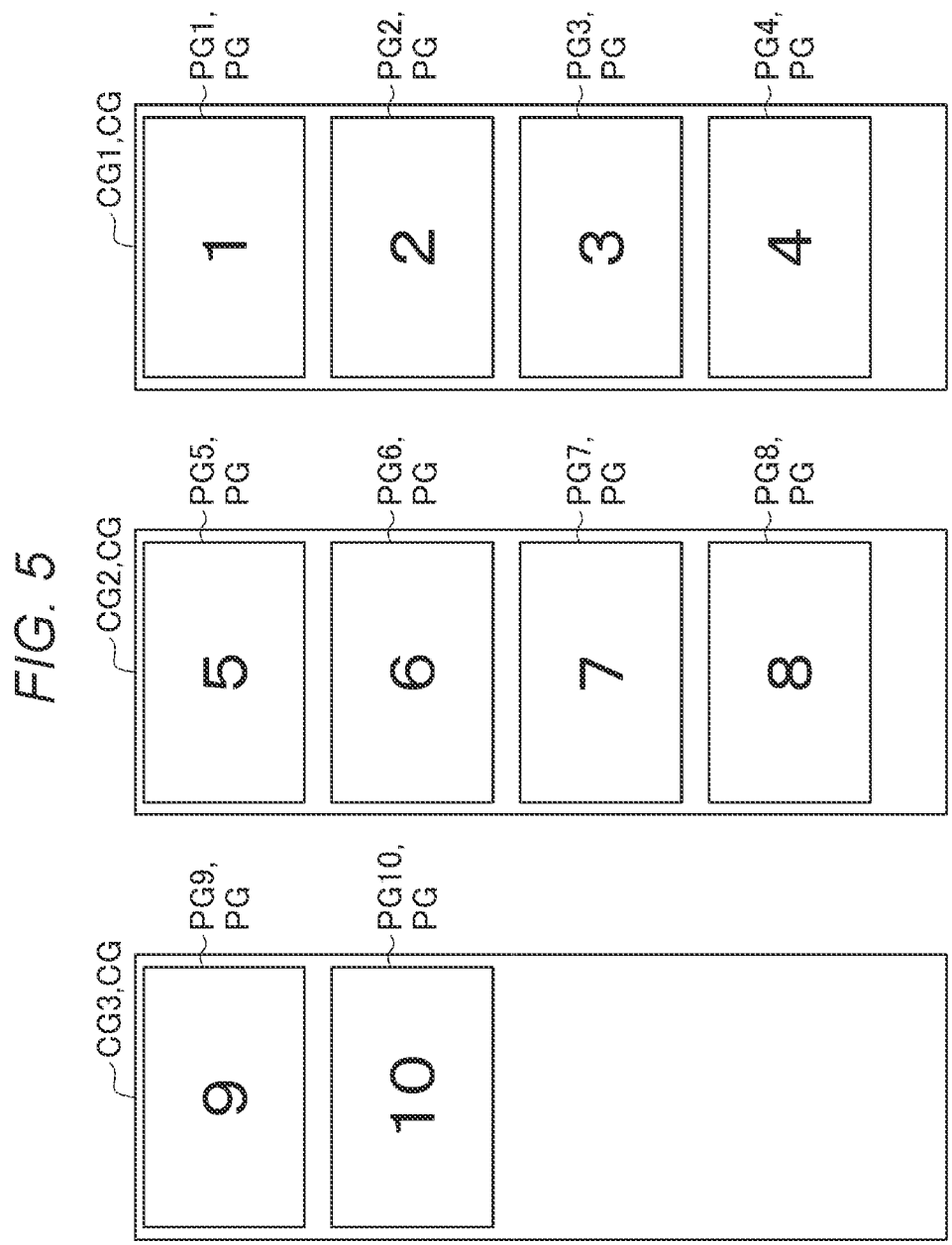
FIG. 5 is a diagram for explaining a row image.
Figure 6:
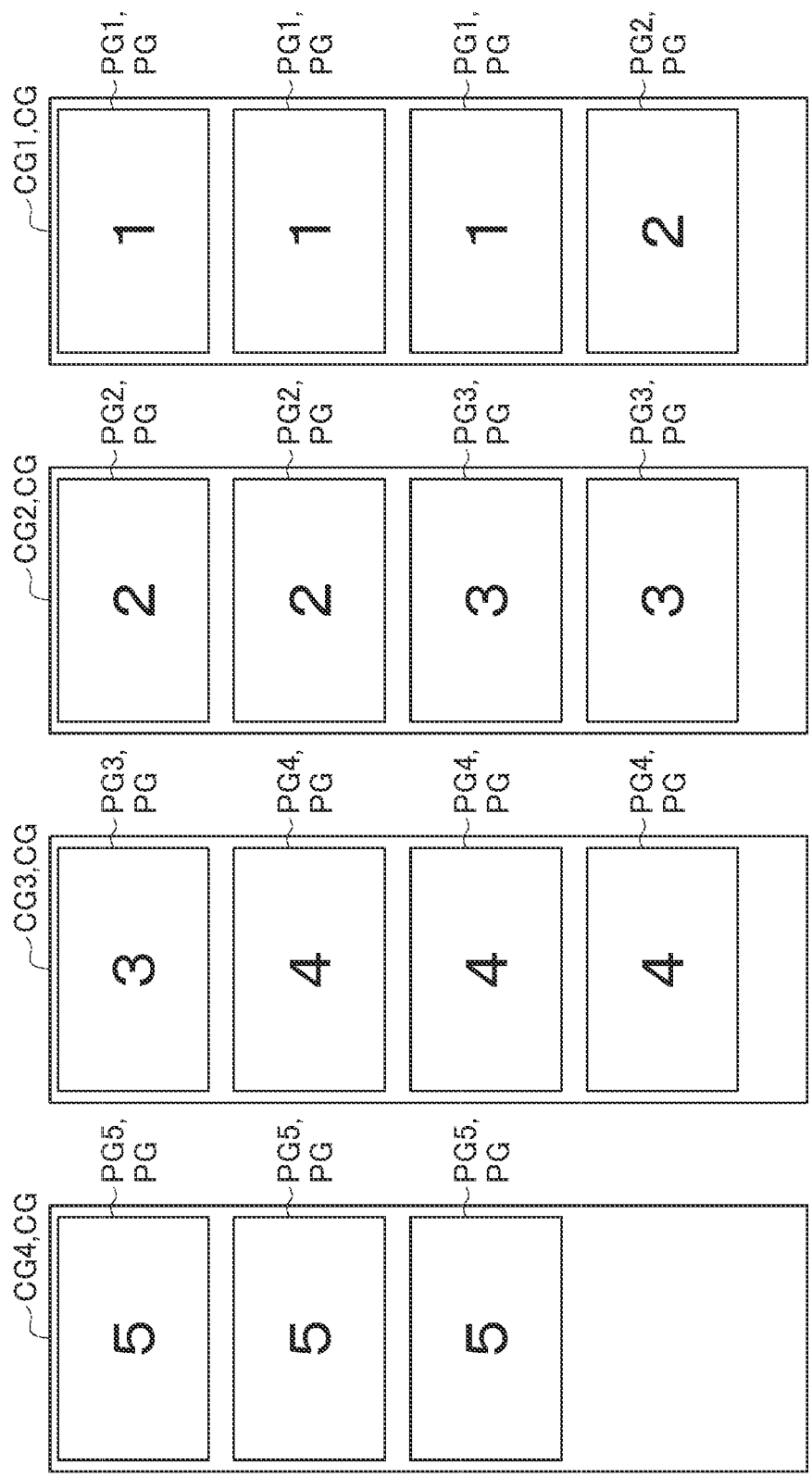
FIG. 6 is a diagram for explaining a row image.

FIGS. 5 and 6 are diagrams for explaining the row image CG.

In FIGS. 5 and 6, a number shown in the page image PG indicates a page number.

Each of the row images CG shown in FIG. 5 is the row image CG displayed by the printing preview screen VG when printing content for printing one sheet per one page is shown. FIG. 5 illustrates a case in which the variable data 123 is configured by ten pages and one row image CG includes four page images PG.

On the printing preview screen VG for printing one sheet per one page, the plurality of page images PG included in the row image CG have continuous page numbers. The plurality of page images PG included in the row image CG are arranged such that page numbers increase toward the down direction in the figure.

In an example shown in FIG. 5, the variable data 123 is configured by ten pages and one row image CG includes four page images PG. Accordingly, as shown in FIG. 5, a row image CG1 includes page images PG1, PG2, PG3, and PG4, a row image CG2 includes page images PG5, PG6, PG7, and PG8, and a row image CG3 includes page images PG9 and PG10.

Each of the row images CG shown in FIG. 6 is the row image CG displayed by the printing preview screen VG when printing content for printing three sheets per one page is shown.

As shown in FIG. 6, on the printing preview screen VG for printing a plurality of images per one page, the page images PG having the same page number are arranged adjacent to one another in one row image CG. In page number units, in one row image CG, page numbers are continuous and increase toward the down direction in the figure. When not all of the plurality of page images PG having the same page number can be included in one row image CG, the plurality of page images PG having the same page number are included in a plurality of row images CG having continuous row numbers.

In an example shown in FIG. 6, the variable data 123 is configured by five pages and one row image CG includes four page images PG. Accordingly, the row image CG1 includes three page images PG1 and one page image PG2, the row image CG2 includes two page images PG2 and two page images PG3, the row image CG3 includes one page image PG3 and three page images PG4, and a row image CG4 includes three page images PG5.

Referring back to FIG. 4, the operation region PA2 includes a plurality of software buttons for switching display content of the image display region PA1. The operation region PA2 includes, as the software buttons, a first page unit switching button KB1, a second page unit switching button KB2, a first row unit switching button KB3, a second row unit switching button KB4, a leading row switching button KB5, and a last row switching button KB6. The operation region PA2 includes a page number input field NA. Details of the operation region PA2 are explained below. The first row unit switching button KB3, the second row unit switching button KB4, the leading row switching button KB5, and the last row switching button KB6 are switching buttons KB for switching, in the row image CG units, the row image CG displayed by the printing preview screen VG to another row image CG. Switching in the row image CG units means that the user operates the switching button KB once to switch the displayed row image CG to another row image CG.

The first row unit switching button KB3 and the second row unit switching button KB4 are examples of a "row unit switching button". The page number input field NA is an example of a "receiving section".

The setting region SA is a region for receiving various settings for the page image PG displayed in the image display region PA1. The setting region SA in this embodiment receives setting of a layout of the page image PG and setting of a color of the page image PG. The setting region SA includes a layout setting button RB for performing layout setting for the page image PG and a color setting button CB for performing color setting for the page image PG. Each of the layout setting button RB and the color setting button CB is a software button. FIG. 4 shows a state in which the layout setting button RB is selected in the setting region SA.

The setting region SA for layout setting includes spin buttons SPB1, SPB2, SPB3, and SPB4 and receives setting of enlargement and reduction of the page image PG via the spin buttons SPB1, SPB2, SPB3, and SPB4. The setting region SA for layout setting includes a pulldown PD1 and receives setting of rotation of the page image PG via the pulldown PD1. The setting region SA for layout setting includes spin buttons SPB5 and SPB6 and receives setting of a margin in the row image CG via the spin buttons SPB5 and SPB6. The setting region SA for layout setting includes spin buttons SPB7 and SPB8 and receives setting of the number of prints per one page and setting of an interval between two page images PG via the spin buttons SPB7 and SPB8. The setting region SA for layout setting includes a spin button SPB9 and receives setting of the number of prints via the spin button SPB9. The setting region SA for layout setting includes a pulldown PD2 and receives, via the pulldown PD2, setting about whether to display the plurality of page images PG side by side, that is, setting about whether the row image CG is displayed.

In the case of setting for displaying the row image CG, the number of page images PG included in one row image CG changes according to content set in the setting region SA for layout setting.

As shown in FIG. 4, the printing preview screen VG includes an addition button TB, a deletion button DB, and a printing button PB. The addition button TB, the deletion button DB, and the printing button PB are software buttons. The addition button TB is a button for adding data including the variable data 123 to the printing preview screen VG. The deletion button DB is a button for deleting data including the variable data 123 from the printing preview screen VG. The printing button PB is a button for performing printing based on the variable data 123. When the printing button PB is operated, the data processing section 114 generates raster data or printing data. The data processing section 114 generates and outputs the raster data or the printing data in order from the row image CG having the smallest row number. Consequently, a plurality of row images CG are printed on the printing medium S such that the row images CG having smaller row numbers are located further downstream in the conveying direction F.

The operation region PA2 is explained in detail with reference to FIGS. 7, 8, 9, and 10. In examples shown in FIGS. 7, 8, 9, and 10, the setting region SA receives setting for displaying the row image CG via the pulldown PD2.

Figure 7:
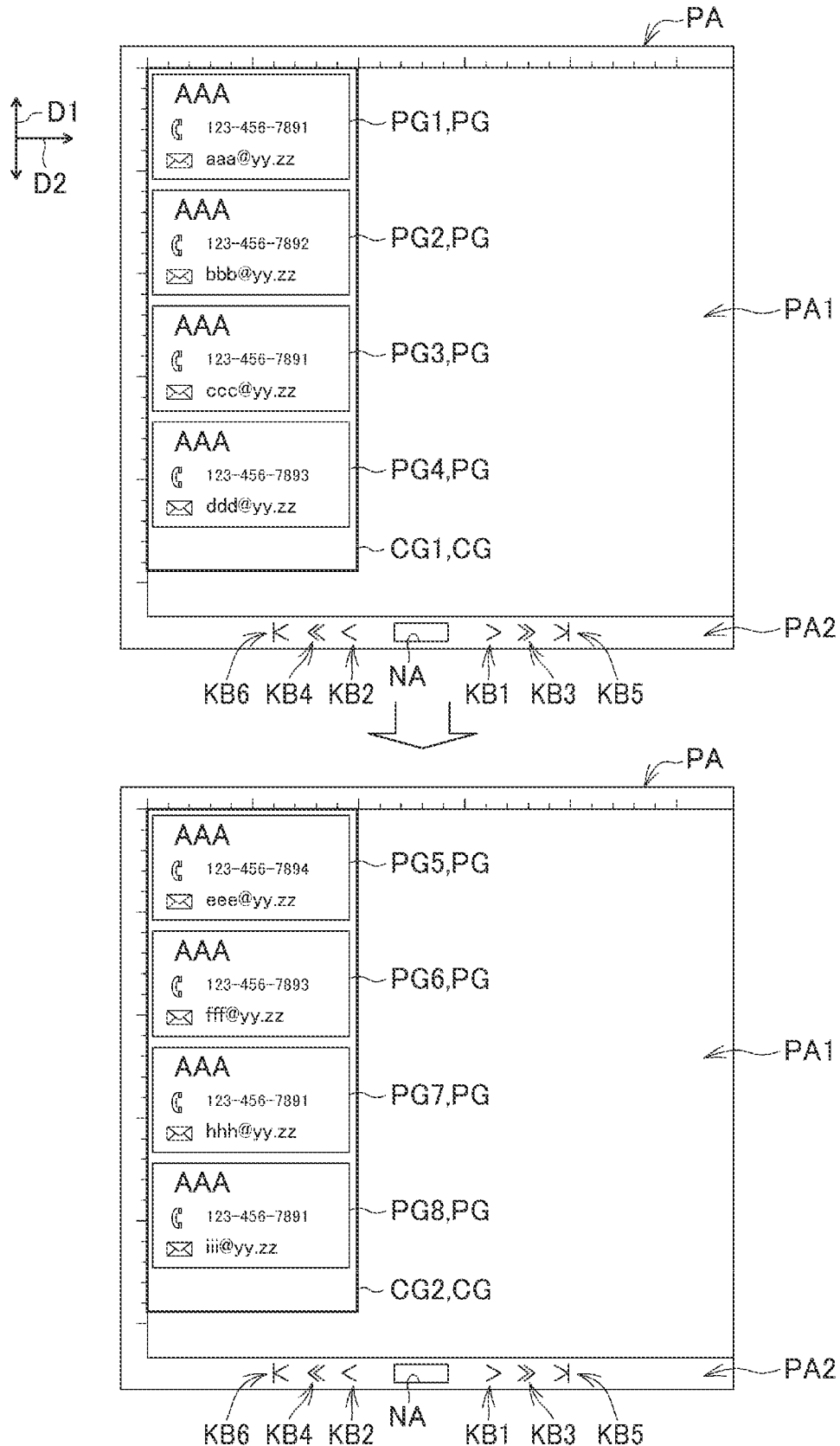
FIG. 7 is a diagram for explaining a page unit switching button.

FIG. 7 is a diagram for explaining the first page unit switching button KB1 and the second page unit switching button KB2.

The first page unit switching button KB1 and the second page unit switching button KB2 are operated to switch, in page units, the page image PG selected in the image display region PA1. When the first page unit switching button KB1 is operated once, the display processing section 113 switches a selection target from a page image PGn to a page image PGn−1.

For example, when the page image PG2 is selected in the image display region PA1 and the first page unit switching button KB1 is operated once, the display processing section 113 switches the selection target from the page image PG2 to the page image PG1.

When the second page unit switching button KB2 is operated once, the display processing section 113 switches the selection target from the page image PGn to a page image PGn+1.

For example, when the page image PG2 is selected in the image display region PA1 and the second page unit switching button KB2 is operated once, the display processing section 113 switches the selection target from the page image PG2 to the page image PG3.

It is assumed that the first page unit switching button KB1 is operated once in a state in which the page image PG corresponding to a page having the smallest page number is selected in the row image CG displayed in the image display region PA1. In this case, the display control section 113 switches the row image CG displayed in the image display region PA1 from a row image CGm to a row image CGm−1.

For example, it is assumed that, when the variable data 123 is configured by ten pages and one row image CG includes four page images PG, the row image CG2 is displayed in the image display region PA1 and the page image PG5 is selected. In this case, when the first page unit switching button KB1 is operated once, the display processing section 113 switches the row image CG displayed in the image display region PA1 from the row image CG2 to the row image CG1.

It is assumed that the second page unit switching button KB2 is operated once in a state in which the page image PG corresponding to a page having the largest page number is selected in the row image CG displayed in the image display region PA1. In this case, the display processing section 113 switches the row image CG displayed in the image display region PA1 from the row image CGm to a row image CGm+1.

For example, it is assumed that, when the variable data 123 is configured by ten pages and one row image CG includes four page images PG, the row image CG1 is displayed in the image display region PA1 and the page image PG4 is selected. In this case, when the second page unit switching button KB2 is operated once, the display processing section 113 switches the row image CG displayed in the image display region PA1 from the row image CG1 to the row image CG2. FIG. 7 shows a switching form in this example.

FIG. 8 is a diagram for explaining the first row unit switching button KB3 and the second row unit switching button KB4.

The first row unit switching button KB3 and the second row unit switching button KB4 are operated to switch the row image CG displayed in the image display region PA1 to another row image CG. When the first row unit switching button KB3 is operated once, the display processing section 113 switches the row image CG displayed in the image display region PA1 from the row image CGm to the row image CGm−1.

For example, when the first row unit switching button KB3 is operated once in a state in which the row image CG2 is displayed in the image display region PA1, the display processing section 113 switches the row image CG displayed in the image display region PA1 from the row image CG2 to the row image CG1.

When the second row unit switching button KB4 is operated once, the display processing section 113 switches the row image CG displayed in the image display region PA1 from the row image CGm to the row image CGm+1.

For example, it is assumed that, when the variable data 123 is configured by ten pages and one row image CG includes four page images PG, the row image CG2 is displayed in the image display region PA1. In this case, when the second row unit switching button KB4 is operated once, the display processing section 113 switches the row image CG displayed in the image display region PA1 from the row image CG2 to the row image CG3. FIG. 8 shows a switching form of this example.

Figure 9:
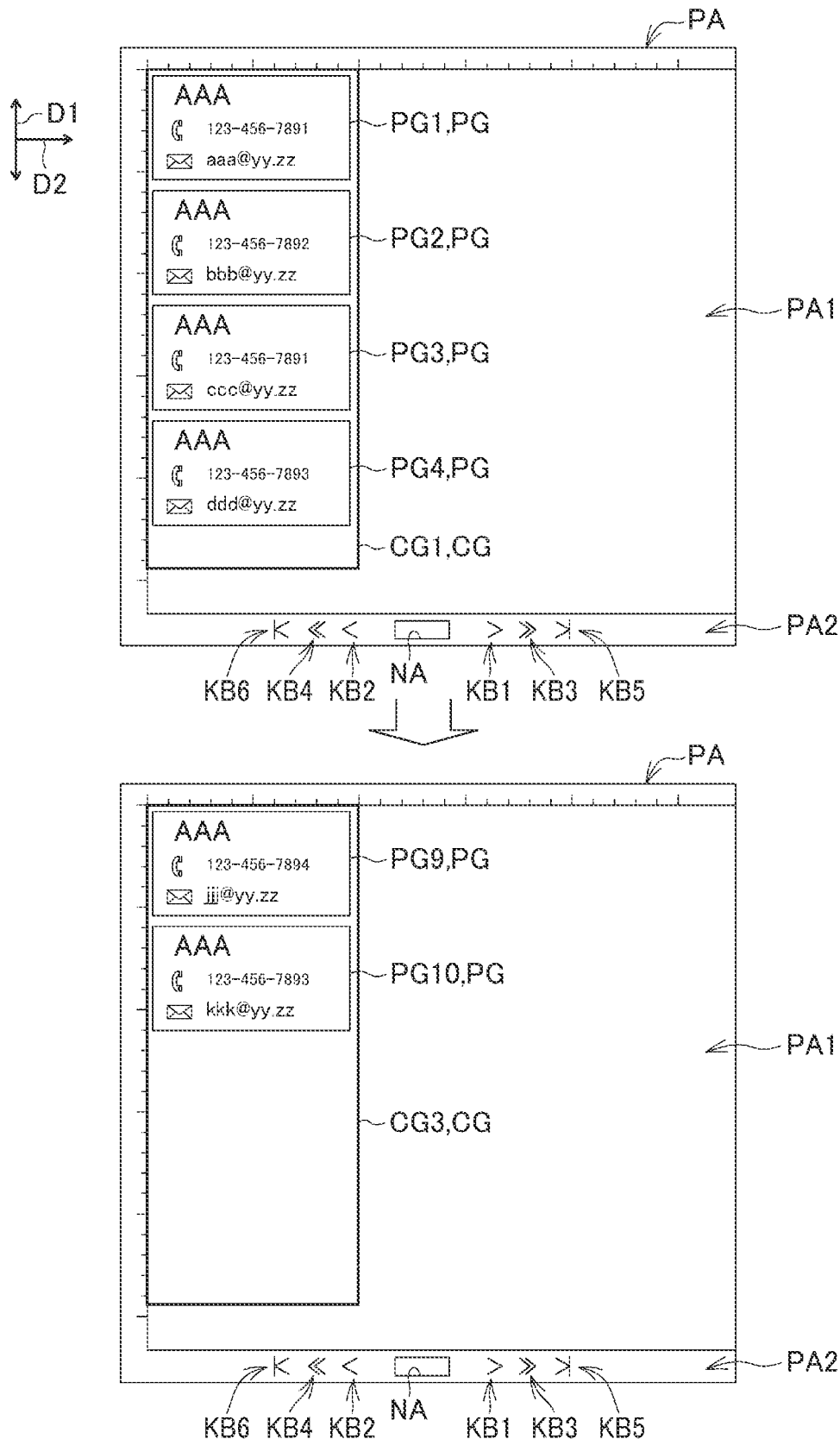
FIG. 9 is a diagram for explaining a leading row switching button and a last row switching button.

FIG. 9 is a diagram for explaining the leading row switching button KB5 and the last row switching button KB6.

The leading row switching button KB5 and the last row switching button KB6 are operated to switch the row image CG displayed in the image display region PA1 to another row image CG. When the leading row switching button KB5 is operated once, the display processing section 113 switches the row image CG displayed in the image display region PA1 to the row image CG1. The row image CG1 is the row image CG including the page image PG corresponding to a first page among the page images PG included in the variable data 123.

For example, when the leading row switching button KB5 is operated once in a state in which the row image CG3 is displayed in the image display region PA1, the display processing section 113 switches the row image CG displayed in the image display region PA1 from the row image CG3 to the row image CG1.

When the last row switching button KB6 is operated once, the display processing section 113 switches the row image CG displayed in the image display region PA1 to the row image CG including the page image PG corresponding to the last page among the page images PG included in the variable data 123.

For example, it is assumed that, when the variable data 123 is configured by ten pages and one row image CG includes four page images PG, the row image CG1 is displayed in the image display region PA1. In this case, when the last row switching button KB6 is operated once, the display processing section 113 switches the row image CG displayed in the image display region PA1 from the row image CG1 to the row image CG3. FIG. 9 shows a switching form of this example.

Figure 10:
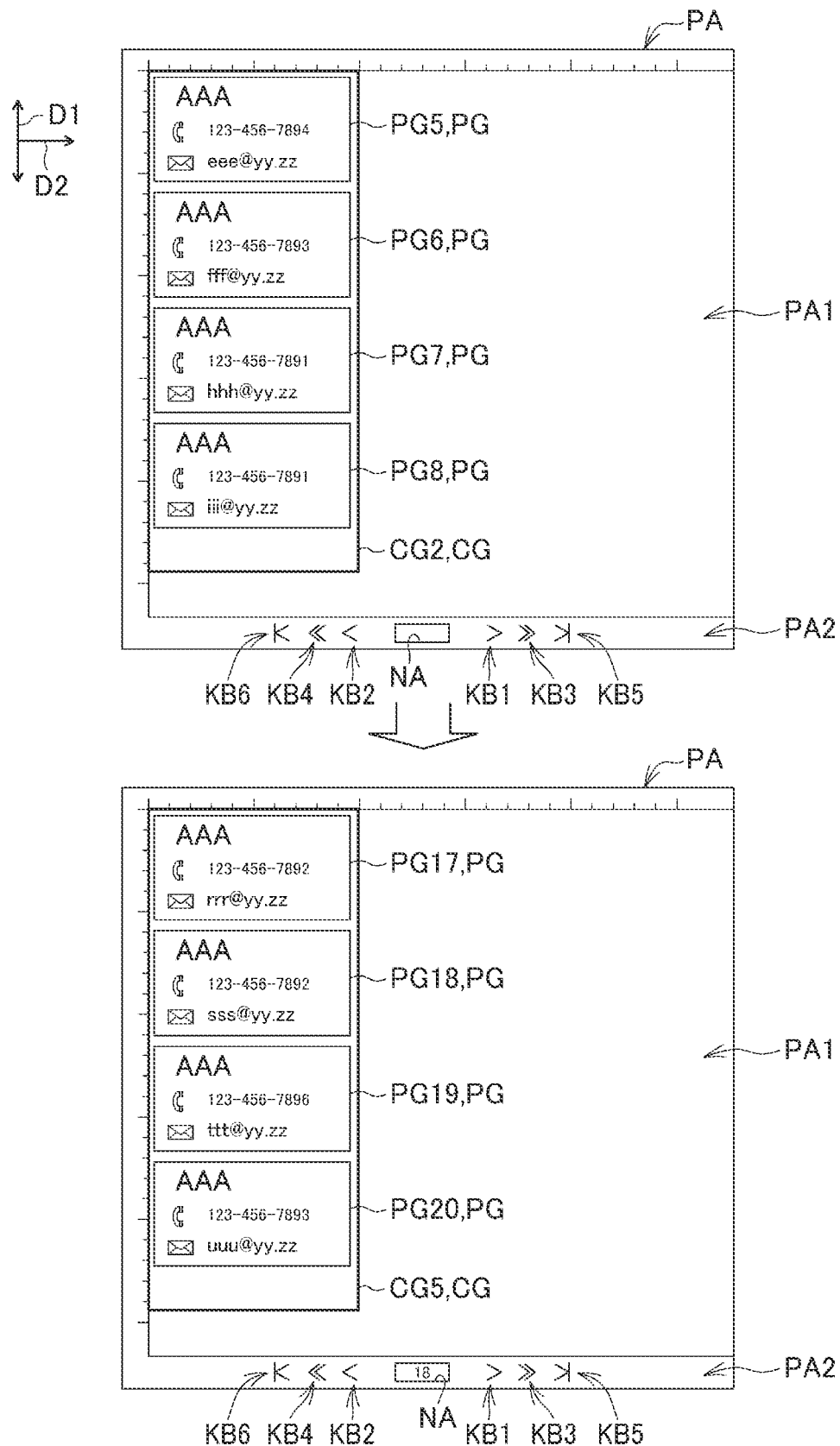
FIG. 10 is a diagram for explaining a page number input field.

FIG. 10 is a diagram for explaining the page number input field NA.

The page number input field NA receives an input of a page number as designation of a page. The display processing section 113 switches the row image CG displayed in the image display region PA1 to the row image CG including the page image PG corresponding to a page having the page number input to the page number input field NA.

For example, it is assumed that, when the variable data 123 is configured by twenty pages and one row image CG includes four page images PG, the row image CG2 is displayed in the image display region PA1. In this case, when an eighteenth page number is input to the page number input field NA, the display processing section 113 switches the row image CG displayed in the image display region PA1 from the row image CG2 to a row image CG5. FIG. 10 shows a switching form of this example.

An example shown in FIG. 10 illustrates the printing preview screen VG for printing one sheet per one page. When a plurality of page images PG corresponding to a page designated via the page number input field NA are included in a plurality of row images CG on the printing preview screen VG for printing a plurality of images per one page, the display processing section 113 switches the row image CG displayed in the image display region PA1 to the next row image CG.

That is, the row image CG switched by the display processing section 113 includes the page image PG arranged next to the page image PG corresponding to an immediately preceding page of the page designated via the page number input field NA among the plurality of page images PG corresponding to the page designated via the page number input field NA. To explain in detail with reference to FIG. 6, for example, when a second page number is input to the page number input field NA, the display processing section 113 switches the row image CG displayed by the printing preview screen VG to the row image CG1 including the page image PG2 arranged next to the page image PG1.

When all of the plurality of page images PG corresponding to the page designated via the page number input field NA are included in one row image CG on the printing preview screen VG for printing a plurality of images per one page, the display processing section 113 switches the row image CG displayed in the image display region PA1 to the next row image CG. That is, the display processing section 113 switches the row image CG to the row image CG including the page image PG corresponding to the page having the page number input to the page number input field NA. To explain in detail with reference to FIG. 6, for example, when a fifth page number is input to the page number input field NA, the display processing section 113 switches the row image CG displayed by the printing preview screen VG to the row image CG1 including the page image PG5.

Subsequently, the operation of the control device 100 is explained. In the explanation of the operation of the control device 100, an operation performed when data is added to the printing preview screen VG and an operation performed when the operation region PA2 is operated are separately explained.

First, the operation performed when data is added to the printing preview screen VG is explained.

Figure 11:
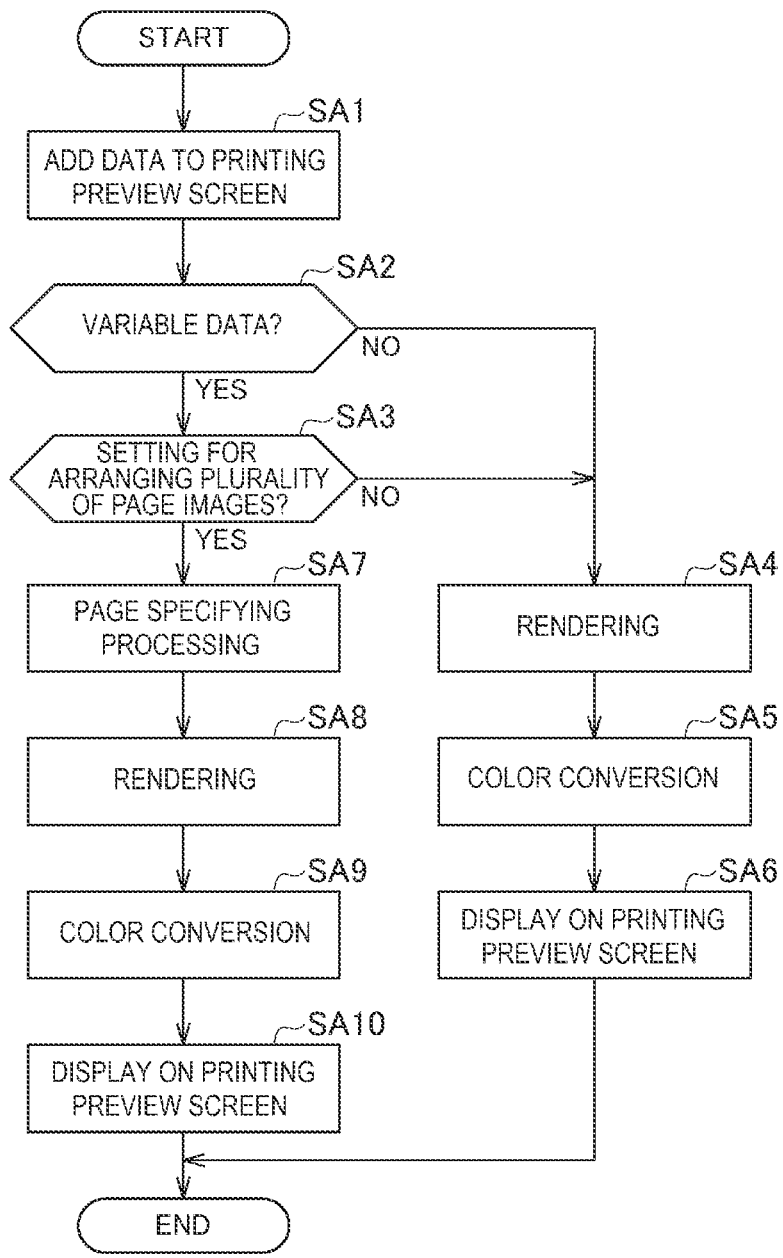
FIG. 11 is a flowchart showing the operation of a control device.

FIG. 11 is a flowchart showing the operation of the control device 100.

The display processing section 113 of the control device 100 adds data to the printing preview screen VG based on operation of the addition button TB (step SA1).

The display processing section 113 determines whether the data added in step SA1 is the variable data 123 (step SA2).

The determination in step SA2 is explained in detail.

For example, when a data format of the added data is a data format of PDF/VT, the display processing section 113 determines that the data added in step SA1 is the variable data 123. When the data format of the added data is not the data format of PDF/VT, the display processing section 113 determines that the data added in step SA1 is not the variable data 123. PDF is an abbreviation of Portable Document Format. VT is an abbreviation of Variable and Transactional. PDF/VT is a data format of PDF specified by Adobe Systems (registered trademark).

For example, when the added data has a DPart hierarchical structure, the display processing section 113 determines that the data added in step SA1 is the variable data 123. When the added data does not have the DPart hierarchical structure, the display processing section 113 determines that the data added in step SA1 is not the variable data 123.

When determining that the added data is not the variable data 123 (NO in step SA2), the display processing section 113 performs processing in step SA4. On the other hand, when determining that the added data is the variable data 123 (YES in step SA2), the display processing section 113 determines whether setting is to display the plurality of page images PG side by side, that is, whether the setting is to display the row image CG (step SA3).

Step SA3 is explained in detail.

For example, when the pulldown PD2 indicates "vertically close arrangement" in the setting region SA where layout setting for the page image PG is performed, the display processing section 113 makes an affirmative determination in step SA3. On the other hand, when the pulldown PD2 indicates arrangement other than the "vertically close arrangement", the display processing section 113 makes a negative determination in step SA3.

When determining that the setting is not to display the plurality of page images PG side by side (NO in step SA3), the display processing section 113 performs rendering of one page image PG to be displayed in the image display region PA1 (step SA4).

The display processing section 113 converts a color of the rendered one page image PG into a color set in the setting region SA (step SA5).

The display processing section 113 displays the one page image PG, the color of which is converted, in the image display region PA1 (step SA6). That is, the display processing section 113 causes the display device 160 to display the printing preview screen VG on which the one page image PG, the color of which is converted, is displayed.

Returning to the explanation of step SA3, when determining that the setting is to display the plurality of page images PG side by side (YES in step SA3), the display processing section 113 performs page specifying processing (step SA7).

In the page specifying processing, the display processing section 113 specifies a plurality of display target pages based on the number of pages corresponding to the layout setting of the setting region SA. For example, it is assumed that, when the variable data 123 is added to the printing preview screen VG, it is determined in advance to display the row image CG1 and the number of pages corresponding to the layout setting is four. In this case, the display processing section 113 specifies a page 1 to a page 4 in the page specifying processing.

Subsequently, the display processing section 113 performs rendering of the page image PG corresponding to the page specified in the page specifying processing (step SA8).

The display processing section 113 converts a color of the rendered page image PG into the color set in the setting region SA (step SA9).

The display processing section 113 displays the row image CG including the page image PG, the color of which is converted, in the image display region PA1 (step SA10). That is, the display processing section 113 causes the display device 160 to display the printing preview screen VG on which the row image CG including the page image PG, the color of which is converted, is displayed.

Subsequently, the operation of the control device 100 performed when the operation region PA2 is operated is explained.

Figure 12:
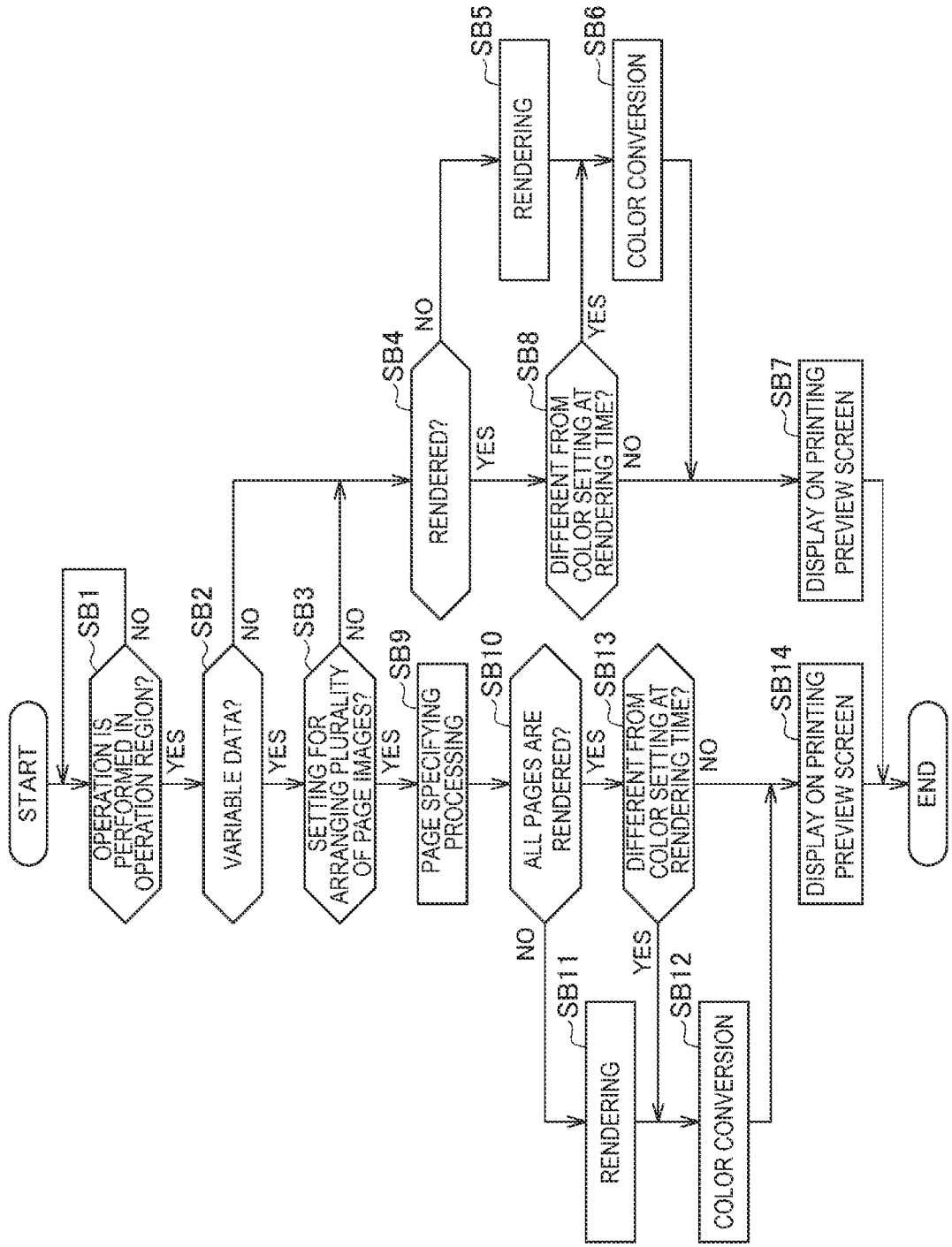
FIG. 12 is a flowchart showing the operation of the control device.

FIG. 12 is a flowchart showing the operation of the control device 100.

The display processing section 113 of the control device 100 determines whether operation is performed in the operation region PA2 (step SB1).

When determining that operation is not performed in the operation region PA2 (NO in step SB1), the display processing section 113 performs the determination in step SB1 again.

On the other hand, when determining that operation is performed in the operation region PA2 (YES in step SB1), the display processing section 113 determines whether data including the page image PG to be displayed in the image display region PA1 is the variable data 123 (step SB2). The display processing section 113 performs the determination in step SB2 in the same manner as the determination in step SA1.

When determining that the data including the page image PG to be displayed in the image display region PA1 is not the variable data 123 (NO in step SB2), the display processing section 113 performs processing in step SB4.

On the other hand, when determining that the data including the page image PG to be displayed in the image display region PA1 is the variable data 123 (YES in step SB2), the display processing section 113 determines whether setting is to display the plurality of page images PG side by side, that is, the setting is to display the row image CG (step SB3). The display processing section 113 performs the determination in step SB3 in the same manner as the determination in step SA3.

When determining that the setting is not to display the plurality of page images PG side by side (NO in step SB3), the display processing section 113 determines whether display target one page image PG is already rendered (step SB4).

When determining that the display target one page image PG is not already rendered (NO in step SB4), the display processing section 113 renders display target one page image PG (step SB5). A rendered page image PG is stored in the memory 120 in association with information indicating color setting at a rendering time and an appropriate page number.

The display processing section 113 converts a color of the rendered one page image PG into the color set in the setting region SA (step SB6).

The display processing section 113 displays the one page image PG, the color of which is converted, in the image display region PA1 (step SB7).

Returning to the explanation of step SB4, when determining that the display target one page image PG is already rendered (YES in step SB4), the display processing section 113 determines whether color setting at the rendering time and present color setting indicated by the setting region SA are different about the display target one page image PG (step SB8).

When determining that the color setting at the rendering time and the present color setting are different (YES in step SB8), the display processing section 113 reads out the display target one page image PG from the memory 120 and converts a color of the read-out page image PG into a color corresponding to the present color setting of the setting region SA (step SB6). The display processing section 113 displays the page image PG, the color of which is converted, in the image display region PA1 (step SB7).

On the other hand, when determining that the color setting at the rendering time and the present color setting are the same (NO in step SB8), the display processing section 113 reads out the display target one page image PG from the memory 120 and displays the display target one page image PG in the image display region PA1 (step SB7). When making a negative determination in step SB8, the display processing section 113 does not perform the color conversion of the read-out page image PG.

Returning to the explanation of step SB3, when determining that the setting is to display the plurality of page images PG side by side (YES in step SB3), the display processing section 113 performs page specifying processing (step SB9).

In the page specifying processing in step SB9, the display processing section 113 specifies a plurality of display target pages based on operation received in the operation region PA2 and the number of pages corresponding to the layout setting of the setting region SA. For example, in the case of an example shown in FIG. 7, in the page specifying processing, the display processing section 113 specifies that the display target pages are fifth to eighth pages. For example, in the case of an example shown in FIG. 8, in the page specifying processing, the display processing section 113 specifies that the display target pages are ninth and tenth pages. For example, in the case of an example shown in FIG. 9, in the page specifying processing, the display processing section 113 specifies that the display target pages are ninth and tenth pages. For example, in the case of an example shown in FIG. 10, in the page specifying processing, the display processing section 113 specifies that the display target pages are seventeenth to twentieth pages.

The display processing section 113 determines whether rendering is already performed about all of the pages specified in the page specifying processing (step SB10). As explained above, the rendered page image PG is stored in the memory 120 in association with the information indicating the color setting at the rendering time and the appropriate page number.

When determining that rendering is not already performed about all the pages (NO in step SB10), the display processing section 113 performs rendering of the page images PG corresponding to the pages specified in the page specifying processing (step SB11).

The display processing section 113 converts a color of the rendered page images PG to the color set in the setting region SA (step SB12).

The display processing section 113 displays the row image CG including the page images PG, the color of which is converted, in the image display region PA1 (step SA14).

Returning to the explanation of step SB10, when determining that the rendering is already performed about all the pages (YES in step SB10), the display processing section 113 determines whether the color setting at the rendering time and the present color setting indicated by the setting region SA are different about each of the display target page images PG (step SB13).

When determining that the color setting at the rendering time and the present color setting are different (YES in step SB13), the display processing section 113 reads out all of the display target page images PG from the memory 120 and converts a color of all of the read-out page images PG into a color corresponding to the present color setting (step SB12). The display processing section 113 displays the row image CG including the page images PG, the color of which is converted, in the image display region PA1 (step SB14).

On the other hand, when determining that the color setting at the rendering time and the present color setting are the same (NO in step SB13), the display processing section 113 reads out all of the display target page images PG from the memory 120 and displays the row image CG including all of the read-out page images PG in the image display region PA1 (step SB14). When making a negative determination in step SB13, the display processing section 113 does not perform the color conversion of the read-out page images PG.

As explained above, the control device 100 includes the memory 120 that stores the variable data 123 including the plurality of page images PG each including the variable region VA in which an image is variable for each page and the non-variable region NVA including the same image irrespective of the page and the display processing section 113 that causes the display device 160 to display the printing preview screen VG for the variable data 123. The display processing section 113 causes the display device 160 to display the printing preview screen VG that displays one row image CG in which the plurality of page images PG are arranged in a row in the first direction D1 corresponding to the width direction of the printing medium S.

Consequently, since the plurality of page images PG corresponding to pages are simultaneously displayed on the printing preview screen VG, the user can easily grasp the printing content of the variable printing.

The display processing section 113 switches the row image CG displayed by the printing preview screen VG to another row image CG.

Consequently, since the row image CG displayed by the printing preview screen VG is switched to the other row image CG, even when a plurality of page images PG are included in a plurality of row images CG, the user can easily grasp the printing content of the variable printing.

The printing preview screen VG includes the row unit switching button. When the row unit switching button is operated, the display processing section 113 switches the row image CG displayed by the printing preview screen VG to the row image CG in the immediately preceding row or the immediately following row.

Consequently, since the row image CG is switched to the row image CG in the immediately preceding row or the immediately following row when the row unit switching button is operated, it is possible to switch the row image CG to the row image CG in the immediately preceding row or the immediately following row at timing desired by the user. Accordingly, the user can easily grasp the printing content of the variable printing and convenience for the user can be improved. The user can switch the row image CG to another row image CG with one operation. It is possible to reduce time required for display of the other row image CG.

The printing preview screen VG includes at least one of the leading row switching button KB5 and the last row switching button KB6. When the leading row switching button KB5 is operated, the display processing section 113 switches the row image CG displayed by the printing preview screen VG to another row image CG including the page image PG corresponding to a first page among the page images PG included in the variable data 123. When the last row switching button KB6 is operated, the display processing section 113 switches the row image CG displayed by the printing preview screen VG to another row image CG including the page image PG corresponding to a last page among the page images PG included in the variable data 123.

Consequently, by operating the leading row switching button KB5 or the last row switching button KB6, it is possible to switch the row image CG displayed by the printing preview screen VG to the row image CG including the page image PG corresponding to the first page or the last page. Accordingly, the user can easily cause the display device 160 to display the row image CG including the page image PG corresponding to the first page or the last page. The user can more easily grasp the printing content of the variable printing.

The printing preview screen VG includes the page number input field NA for receiving designation of a page. The display processing section 113 switches the row image CG displayed by the printing preview screen VG to another row image CG including the page image PG corresponding to the page, the designation of which is received by the page number input field NA.

Consequently, since the row image CG including the page image PG corresponding to a page designated by the user is displayed, the user can more easily grasp the printing content of the variable printing.

When a plurality of page images PG corresponding to a page designated via the page number input field NA are included in a plurality of row images CG, the other row image CG to which the display processing section 113 switches the row image CG includes the page image PG arranged next to the page image PG corresponding to the immediately preceding page of the page designated via the page number input field NA among the page images PG corresponding to the page designated via the page number input field NA.

Consequently, the user can easily cause the display device 160 to display the row image CG including two page images PG corresponding to the designated page and the immediately preceding page of the designated page on the printing preview screen VG for printing a plurality of images per one page. Accordingly, in variable printing for printing a plurality of images per one page, the user can easily grasp printing content of two pages having continuous page numbers. Accordingly, the user can easily grasp printing content about the variable printing for printing a plurality of images per one page.

The control device 100 includes the data processing section 114 that generates, for each of the row image CG, raster data of the row image CG or printing data of the row image CG and outputs the generated raster data or the generated printing data to the printing control section 112.

Consequently, it is possible to cause the printing apparatus 1 to output a printing result corresponding to printing content displayed by the printing preview screen VG. Accordingly, it is possible to cause the printing apparatus 1 to output a printing result corresponding to printing content grasped by the user.

A display method by the control device 100 includes a step of causing the display device 160 to display the printing preview screen VG for the variable data 123 including a plurality of page images PG including the variable region VA where an image is variable for each page and the non-variable region NVA including the same image irrespective of the page. The printing preview screen VG displays one row image CG in which a plurality of page images PG are arranged in a row in the first direction D1 corresponding to the width direction of the printing medium S.

Consequently, the same effects as the effects of the control device 100 explained above are achieved.

The image processing program 122 causes the processor 110 to function as the display processing section 113 that causes the display device 160 to display the printing preview screen VG for the variable data 123 including a plurality of page images PG including the variable region VA where an image is variable for each page and the non-variable region NVA including the same image irrespective of the page. The display processing section 113 causes the display device 160 to display the printing preview screen VG that displays one row image CG in which a plurality of page images PG are arranged in a row in the first direction D1 corresponding to the width direction of the printing medium S.

Consequently, the same effects as the effects of the control device 100 explained above are achieved.

Second Embodiment

Subsequently, a second embodiment is explained.

About components in the second embodiment, the same components as the components in the first embodiment are denoted by the same reference numerals and signs and detailed explanation of the components is omitted.

Compared with the first embodiment, the second embodiment is different in the number of row images CG displayed on the printing preview screen VG.

Figure 13:
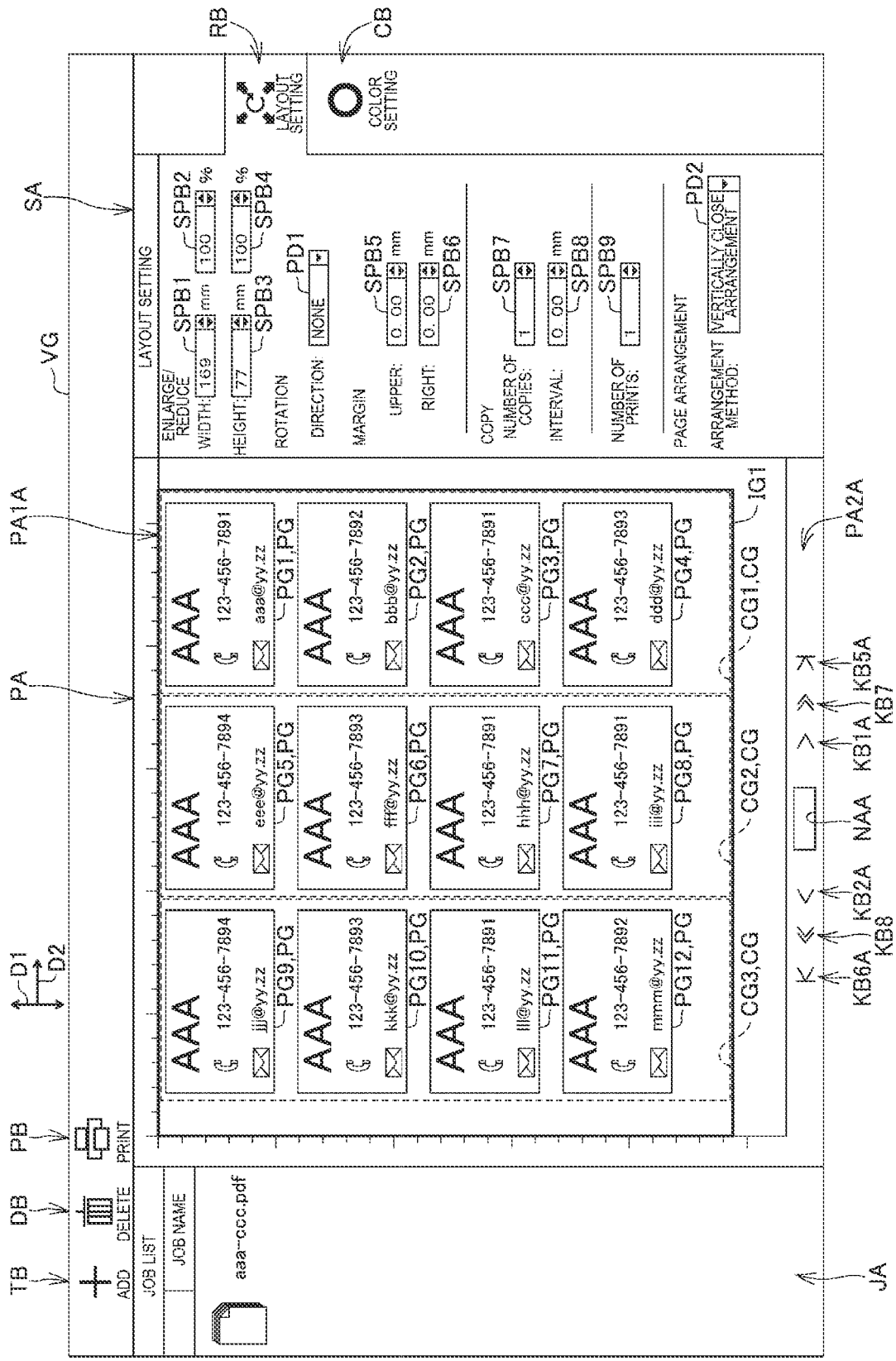
FIG. 13 is a diagram showing an example of a printing preview screen.

FIG. 13 is a diagram showing an example of the printing preview screen VG in the second embodiment.

The printing preview region PA in the second embodiment includes an image display region PA1A and an operation region PA2A.

The image display region PA1A is a region where printing content is displayed. A printable image IG can be displayed in the image display region PA1A. The printable image IG is an image in which a plurality of row images CG are arranged in a row along the second direction D2. An upper limit number of row images CG included in the printable image IG corresponds to an upper limit number of row images CG printable in one conveyance of intermittent printing. The upper limit number corresponds to the length of an image that the ejection heads 41 can print in the X-axis direction.

In the following explanation, when the printable image IG is distinguished, a number is added following the sign of IG. When an i-th printable image IG is described, the i-th printable image IG is described as a printable image IGi; i is an integer equal to or larger than 1. In this embodiment, as the number following the sign of IG is smaller, the printable image IG includes the page image PG having a smaller page number.

In an example shown in FIG. 13, a printable image IG1 including row images CG1, CG2, and CG3 is shown. That is, in the example shown in FIG. 13, the upper limit number of row images CG printable in one conveyance of the intermittent printing is three.

The operation region PA2A includes a plurality of software buttons for switching display content of the image display region PA1A. The operation region PA2A includes, as the software buttons, a first page unit switching button KB1A, a second page unit switching button KB2A, a first image unit switching button KB7, a second image unit switching button KB8, a leading row switching button KB5A, and a last row switching button KB6A.

Like the first page unit switching button KB1, the first page unit switching button KB1A is operated to switch a selection target page image PG. It is assumed that the first page unit switching button KB1A is operated once in a state in which the page image PG corresponding to a page having the smallest page number is selected in the printable image IG displayed in the image display region PA1A. In this case, the display control section 113 switches the printable image IG displayed in the image display region PA1A from a printable image IGi to a printable image IGi−1.

Like the second page unit switching button KB2, the second page unit switching button KB2A is operated to switch a selection target page image PG. It is assumed that the second page unit switching button KB2A is operated once in a state in which the page image PG corresponding to a page having the largest page number is selected in the printable image IG displayed in the image display region PA1A. In this case, the display processing section 113 switches the printable image IG displayed in the image display region PA1A from the printable image IGi to a printable image IGi+1.

The first image unit switching button KB7 and the second image unit switching button KB8 are operated to switch the printable image IG displayed in the image display region PA1A to another printable image IG. When the first image unit switching button KB7 is operated once, the display processing section 113 switches the printable image IG displayed in the image display region PA1A from the printable image IGi to the printable image IGi+1. When the second image unit switching button KB8 is operated once, the display processing section 113 switches the printable image IG displayed in the image display region PA1 from the printable image IGi to the printable image IGi−1.

A page number input field NAA receives an input of a page number as designation of a page. The display processing section 113 switches the printable image IG displayed in the image display region PA1A to the printable image IG including the page image PG corresponding to a page having the page number input to the page number input field NAA.

As explained above, the control device 100 in the second embodiment includes the memory 120 that stores the variable data 123 including the plurality of page images PG each including the variable region VA in which an image is variable for each page and the non-variable region NVA including the same image irrespective of the page and the display processing section 113 that causes the display device 160 to display the printing preview screen VG for the variable data 123. The display processing section 113 causes the display device 160 to display the plurality of printing preview screens VG each displaying the row image CG in which the plurality of page images PG are arranged in a row in the first direction D1 corresponding to the width direction of the printing medium S.

Consequently, since the plurality of page images PG corresponding to pages are simultaneously displayed on the printing preview screen VG, the user can easily grasp printing content of variable printing. Since a larger number of page images PG are simultaneously displayed compared with the first embodiment, the user can more easily grasp the printing content of the variable printing.

The printing preview screen VG displays the printable image IG including a plurality of row images CG printable in one conveyance of intermittent printing. The plurality of row images CG included in the printable image IG are arranged in the second direction D2 corresponding to the conveying direction F of the printing medium S. The display processing section 113 switches the printable image IG displayed by the printing preview screen VG to another printable image IG.

Consequently, since the printable image IG displayed by the printing preview screen VG is switched to the other printable image IG, even when a plurality of page images PG are included in a plurality of printable images IG, the user can easily grasp the printing content of the variable printing.

Third Embodiment

Subsequently, a third embodiment is explained.

About components of sections in the third embodiment, the same components as the components of the sections in the first and second embodiments are denoted by the same reference numerals and signs and detailed explanation of the components is omitted.

Figure 14:
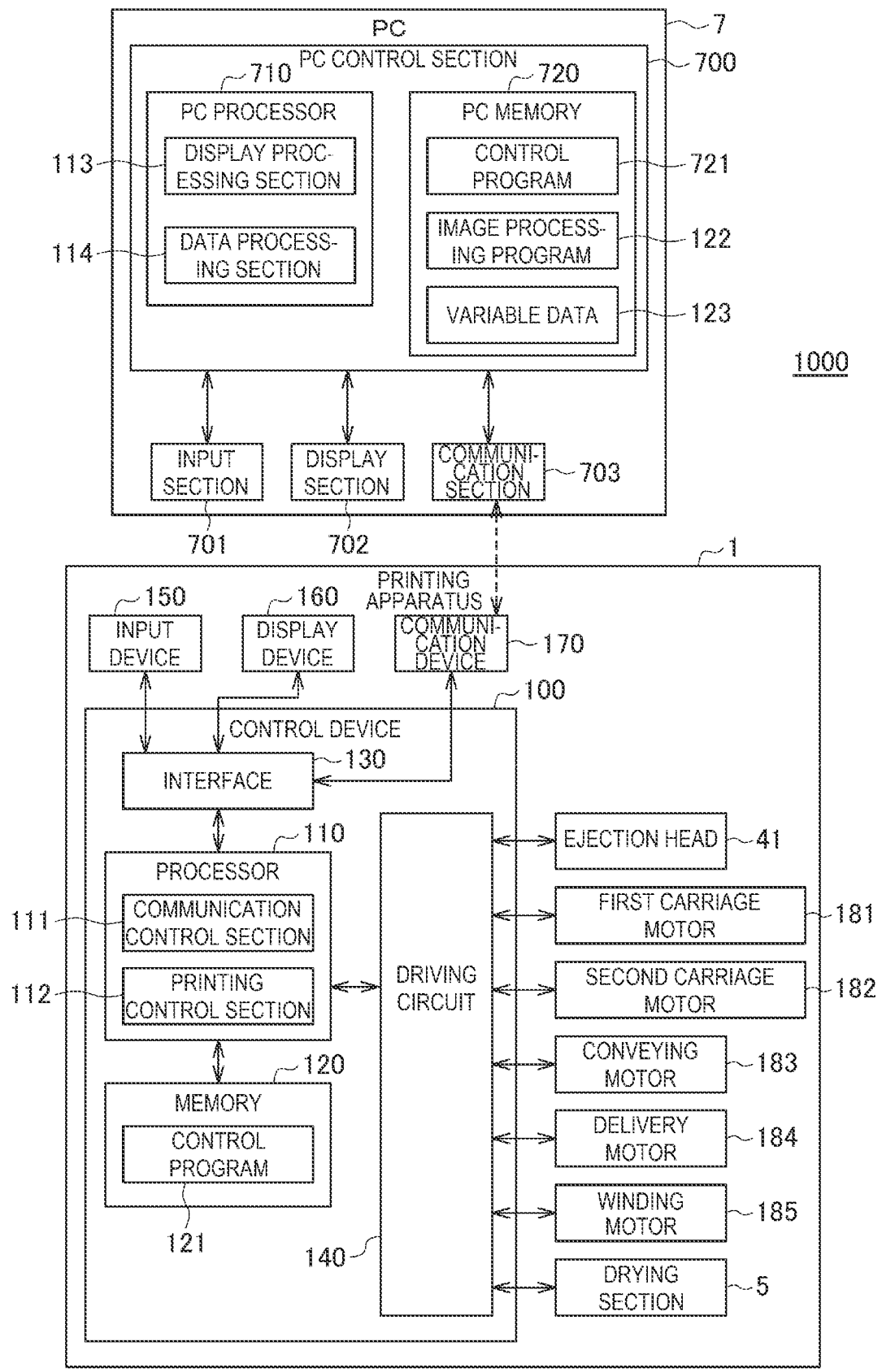
FIG. 14 is a diagram showing the configuration of a printing system.

FIG. 14 is a diagram showing the configuration of a printing system 1000.

The printing system 1000 in the third embodiment includes a printing apparatus 1A and a PC (Personal Computer) 7.

The PC 7 is an example of an "information processing device" in this embodiment.

In the printing apparatus LA, compared with the printing apparatus 1 in the first embodiment, the processor 110 does not function as the display processing section 113 or the data processing section 114. In the printing apparatus 1A, compared with the printing apparatus 1 in the first embodiment, the memory 120 does not store the image processing program 122 or the variable data 123.

The PC 7 may be a notebook PC, may be a desktop PC, may be a tablet PC, or may be a smartphone.

The PC 7 includes a PC control section 700, an input section 701, a display section 702, and a communication section 703.

The PC control section 700 includes a PC processor 710, which is a processor that executes a program such as a CPU or an MPU, and a PC memory 720. The PC processor 710 reads out and executes a control program 721 stored by the PC memory 720, whereby the PC control section 700 controls the sections of the PC 7. The PC processor 710 executes the image processing program 122 stored by the PC memory 720 to function as the display processing section 113 and the data processing section 114 explained in the first embodiment.

In this embodiment, the PC processor 710 is an example of a "processor". In this embodiment, the PC memory 720 is an example of a "storing section".

The PC memory 720 is a memory that stores a program to be executed by the PC processor 710 and data to be processed by the PC processor 710. The PC memory 720 stores the control program 721 and the image processing program 122 to be executed by the PC processor 710, the variable data 123, and other various data. The PC memory 720 includes a nonvolatile storage region. The PC memory 720 may include a volatile storage region and configure a work area of the PC processor 710.

The input section 701 is an input interface that is coupled to input means such as operation switches provided in the PC 7, a panel having a touch input function, a mouse, and a keyboard, detects operation on the input means by a user, and outputs a detection result to the PC control section 700. The PC control section 700 executes, based on an input from the input section 701, processing corresponding to operation on the input means.

The display section 702 includes a display and displays information on the display according to control by the PC control section 700.

The communication section 703 is a communication interface including a communication circuit and a connector and communicates with the printing apparatus 1A according to a predetermined communication standard. The communication standard of the communication section 703 may be a wireless communication standard or may be a wired communication standard.

The PC processor 710 functions as the display processing section 113 and the data processing section 114 explained in the first embodiment.

The display processing section 113 of the PC processor 710 causes the display section 702 to display the printing preview screen VG. When receiving operation of the user on the printing preview screen VG via the input section 701, the display processing section 113 switches display content of the printing preview screen VG to display content corresponding to the received operation. The printing preview screen VG that the display processing section 113 in the third embodiment causes the display section 702 to display may be either the printing preview screen VG in the first embodiment or the printing preview screen VG in the second embodiment.

The data processing section 114 of the PC processor 710 generates, based on the variable data 123, data to be output to the printing control section 112. The data processing section 114 generates raster data such as TIFF data as the data to be output to the printing control section 112. The data processing section 114 generates, for each of the row images CG, raster data of the row image CG explained below. The data processing section 114 outputs the generated rater data to the printing control section 112 of the printing apparatus 1A via the communication section 703. The printing control section 112 of the printing apparatus 1A generates printing data for printing the row image CG indicated by the raster data input from the data processing section 114 and prints the row image CG on the printing medium S based on the generated printing data.

The data processing section 114 of the PC processor 710 may be configured to generate printing data based on the generated raster data and output the generated printing data to the printing control section 112 of the printing apparatus LA.

According to the third embodiment, the same effects as the effects in the first and second embodiments are achieved.

The embodiments explained above only indicate modes of the present disclosure and can be optionally modified and applied within the scope of the present disclosure.

In the third embodiment explained above, the PC 7 is configured to cause the display included in the PC 7 to display the printing preview screen VG. However, the PC 7 may be configured to cause an external display to display the printing preview screen VG.

In the printing preview screen VG explained above, a row number input field may be provided instead of or together with the page number input field NA. The row number input field is a region to which a row number is input. When a row number is input to the row number input field, the display processing section 113 switches the row image CG displayed in the image display region PA1 to the row image CG having the row number input to the row number input field. In the case of this configuration, a row number is given to each of row images CG.

The printing preview screen VG explained above may include the switching button KB for switching the row image CG to the row image CG having the smallest row number and the switching button KB for switching the row image CG to the row image CG having the largest row number.

In the embodiments explained above, the lateral-type inkjet system is illustrated as the printing system of the printing apparatus 1. However, the printing system of the printing apparatus 1 may be a line-type inkjet system or a serial-type inkjet system. The printing system of the printing apparatus 1 is not limited to the inkjet system and may be another printing system such as an electrophotographic system in which toner is used.

In the embodiments explained above, the printing apparatus 1 may have functions other than the printing function such as a scan function and a facsimile function.

The processor 110 and the PC processor 710 may be configured by a plurality of processors or may be configured by a single processor. The processor 110 and the PC processor 710 may be hardware programmed to realize functions of sections explained below. That is, the processor 110 and the PC processor 710 are configured by, for example, an ASIC (Application Specific Integrated Circuit) or an FPGA (Field Programmable Gate Array).

The sections shown in FIGS. 2 and 14 are examples. Specific implementation forms of the sections are not particularly limited. That is, hardware individually corresponding to the sections does not always need to be implemented. It is also naturally possible that one processor is configured to execute a program to realize the functions of the sections. A part of functions realized by software in the embodiments explained above may be realized by hardware or a part of functions realized by hardware in the embodiments may be realized by software. Besides, specific detailed configurations of the control device 100 and the other sections of the printing apparatus 1 can also be optionally changed without departing from the gist of the present disclosure.

Step units of the operations shown in FIGS. 11 and 12 are divided according to main processing contents. The present disclosure is not limited by a method of division and names of processing units. The step units may be divided into a larger number of step units according to the processing contents. The step units may be divided such that one step unit include a larger number of kinds of processing. The order of steps of the step units may be changed as appropriate without hindering the gist of the present disclosure.

What is claimed is:

1. An information processing device comprising:
a storing section configured to store variable data including a plurality of page images each including a first region where an image is variable for each page and a second region including a same image irrespective of the page; and
a display processing section configured to cause a display section to display a printing preview screen for the variable data, wherein
the display processing section causes the display section to display the printing preview screen that displays one or a plurality of row images in which the plurality of page images is arranged in a row in a first direction corresponding to a width direction of a printing medium,
the printing preview screen includes a row unit switching button, and
when the row unit switching button is operated, the display processing section switches the row image displayed by the printing preview screen to the row image in an immediately preceding row or an immediately following row.

2. The information processing device according to claim 1, wherein
the printing preview screen displays the row image, and
the display processing section switches the row image displayed by the printing preview screen to another row image.

3. The information processing device according to claim 2, wherein
the printing preview screen includes at least one of a leading row switching button and a last row switching button,
when the leading row switching button is operated, the display processing section switches the row image displayed by the printing preview screen to another row image including the page image corresponding to a first page among the page images included in the variable data, and when the last row switching button is operated, the display processing section switches the row image displayed by the printing preview screen to another row image including the page image corresponding to a last page among the page images included in the variable data.

4. The information processing device according to claim 2, wherein
the printing preview screen includes a receiving section configured to receive designation of a page, and
when the receiving section receives the designation of the page, the display processing section switches the row image displayed by the printing preview screen to another row image including the page image corresponding to the page designated via the receiving section.

5. The information processing device according to claim 4,
wherein, when a plurality of the page images corresponding to the page designated via the receiving section are included in the plurality of row images, the other row image to which the display processing section switches the row image includes the page image arranged next to the page image corresponding to an immediately preceding page of the page designated via the receiving section among the page images corresponding to the page designated via the receiving section.

6. The information processing device according to claim 1, wherein
the printing preview screen displays a printable image,
the printable image includes a plurality of the row images printable in one conveyance of intermittent printing,
the plurality of row images included in the printable image are arranged in a second direction corresponding to a conveying direction of the printing medium, and
the display processing section switches the printable image displayed by the printing preview screen to another printable image.

7. The information processing device according to claim 1, further comprising a data processing section configured to generate, for each of the row images, raster data of the row image or printing data of the row image and output the generated raster data or the generated printing data to a printing control section.

8. A display method including a display processing section that causes a display section to display a printing preview screen of variable data including a plurality of page images each including a first region where an image is variable for each page and a second region including a same image irrespective of the page, wherein
the printing preview screen displays one or a plurality of row images in which the plurality of page images is arranged in a row in a first direction corresponding to a width direction of a printing medium,
the printing preview screen includes a row unit switching button, and
when the row unit switching button is operated, the display processing section switches the row image displayed by the printing preview screen to the row image in an immediately preceding row or an immediately following row.

9. A non-transitory computer-readable storage medium storing a program, the program causing a processor to function as an image processing section configured to cause a display section to display a printing preview screen of variable data including a plurality of page images each including a first region where an image is variable for each page and a second region including a same image irrespective of the page, wherein
a display processing section causes the display section to display the printing preview screen that displays one or a plurality of row images in which the plurality of page images is arranged in a row in a first direction corresponding to a width direction of a printing medium,
the printing preview screen includes a row unit switching button, and
when the row unit switching button is operated, the display processing section switches the row image displayed by the printing preview screen to the row image in an immediately preceding row or an immediately following row.

* * * * *